United States Patent
Ishimi et al.

(10) Patent No.: US 7,439,993 B2
(45) Date of Patent: Oct. 21, 2008

(54) IMAGE PROCESSING METHOD AND IMAGE PROCESSING APPARATUS

(75) Inventors: Tomomi Ishimi, Numazu (JP); Shinya Kawahara, Numazu (JP); Yoshihiko Hotta, Mishima (JP)

(73) Assignee: Ricoh Company, Ltd., Tokyo (JP)

( * ) Notice: Subject to any disclaimer, the term of this patent is extended or adjusted under 35 U.S.C. 154(b) by 33 days.

(21) Appl. No.: 11/724,503

(22) Filed: Mar. 14, 2007

(65) Prior Publication Data
US 2007/0285488 A1    Dec. 13, 2007

(30) Foreign Application Priority Data

Mar. 15, 2006 (JP) .............................. 2006-071778
Feb. 9, 2007   (JP) .............................. 2007-030651

(51) Int. Cl.
B41J 29/16    (2006.01)

(52) U.S. Cl. .................................................... 347/179

(58) Field of Classification Search ................. 347/179, 347/171; 400/120.01; 430/19; 503/201
See application file for complete search history.

(56) References Cited

U.S. PATENT DOCUMENTS

| | | | |
|---|---|---|---|
| 5,538,822 A * | 7/1996 | Hotta et al. | 430/19 |
| 5,619,243 A | 4/1997 | Hotta et al. | |
| 5,900,900 A | 5/1999 | Hotta et al. | |
| 5,916,841 A | 6/1999 | Amano et al. | |
| 6,015,770 A | 1/2000 | Amano et al. | |
| 6,096,683 A | 8/2000 | Amano et al. | |
| 6,152,620 A * | 11/2000 | Ozawa et al. | 400/120.01 |
| 6,172,001 B1 | 1/2001 | Hotta et al. | |
| 6,174,836 B1 | 1/2001 | Hotta et al. | |
| 6,177,383 B1 | 1/2001 | Amano et al. | |
| 6,329,035 B1 | 12/2001 | Iwasaki et al. | |
| 6,362,130 B1 | 3/2002 | Hotta et al. | |
| 6,489,265 B1 | 12/2002 | Hotta et al. | |
| 6,677,273 B2 * | 1/2004 | Torii et al. | 503/201 |
| 6,734,138 B2 | 5/2004 | Suzuki et al. | |

(Continued)

FOREIGN PATENT DOCUMENTS

JP    56-27936    3/1981

(Continued)

OTHER PUBLICATIONS

Dec. 20, 2007 European search report in connection with corresponding European patent application No. EP 07 10 4146.

*Primary Examiner*—K. Feggins
(74) *Attorney, Agent, or Firm*—Cooper & Dunham LLP

(57) ABSTRACT

To provide an image processing method including at least an image recording step and an image erasing step, wherein a laser beam is parallel light and wherein the laser scanning speed for the peripheral region surrounding the central region of the optical axis of the laser beam is lower than the laser scanning speed for the central region, the laser output for the peripheral region is greater than the output for the central region, or an overlapping area between a laser irradiation area that corresponds to a peripheral region surrounding a central region of the optical axis of the laser beam and a nearby laser irradiation area is larger than an overlapping area between a laser irradiation area that corresponds to the central region and the nearby laser irradiation area.

31 Claims, 17 Drawing Sheets

U.S. PATENT DOCUMENTS

| | | |
|---|---|---|
| 6,770,592 B2 | 8/2004 | Suzuki et al. |
| 6,794,334 B2 | 9/2004 | Hotta et al. |
| 6,818,591 B2 | 11/2004 | Arai et al. |
| 6,969,695 B2 | 11/2005 | Kuboyama et al. |
| 6,989,349 B2 | 1/2006 | Tatewaki et al. |
| 2003/0074260 A1 | 4/2003 | Sugiyama et al. |
| 2005/0014645 A1 | 1/2005 | Shimbo et al. |

FOREIGN PATENT DOCUMENTS

| | | |
|---|---|---|
| JP | 3-81133 | 12/1991 |
| JP | 7-186445 | 7/1995 |
| JP | 8-267797 | 10/1996 |
| JP | 2000-136022 | 5/2000 |
| JP | 2001-88333 | 4/2001 |
| JP | 2002-113889 | 4/2002 |
| JP | 3350836 | 9/2002 |
| JP | 2002-347272 | 12/2002 |
| JP | 2003-127446 | 5/2003 |
| JP | 3446316 | 7/2003 |
| JP | 2003-246144 | 9/2003 |
| JP | 2004-195751 | 7/2004 |
| JP | 2004-322492 | 11/2004 |
| JP | 2004-345273 | 12/2004 |

* cited by examiner

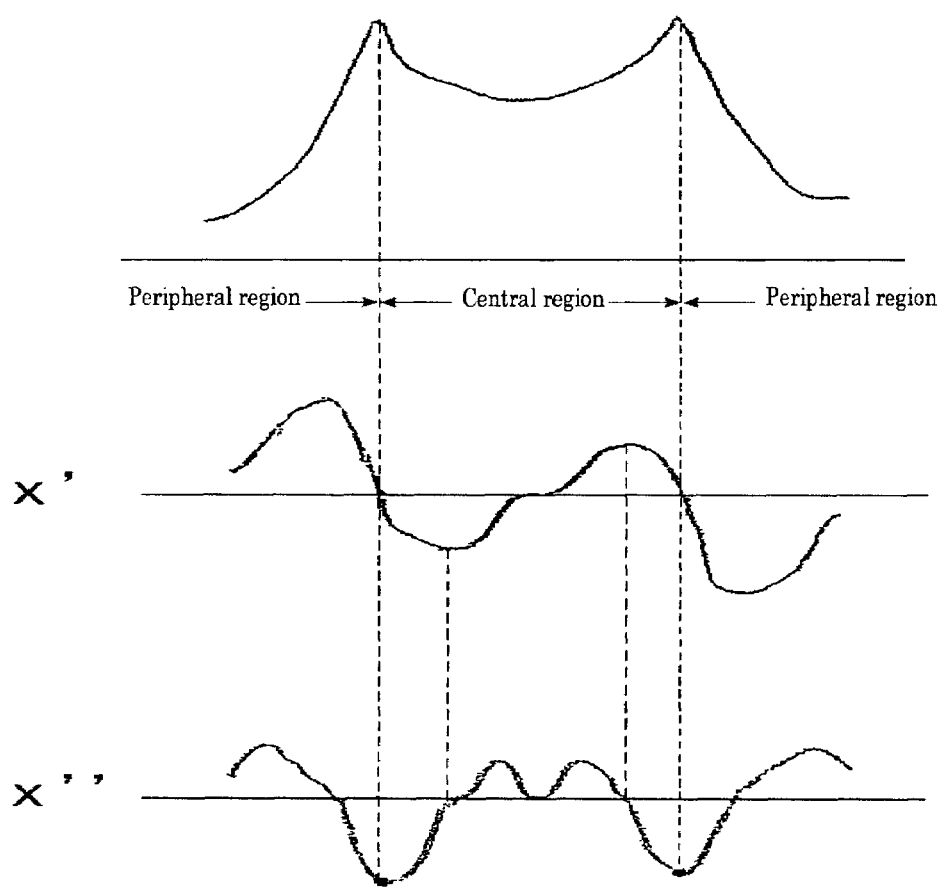

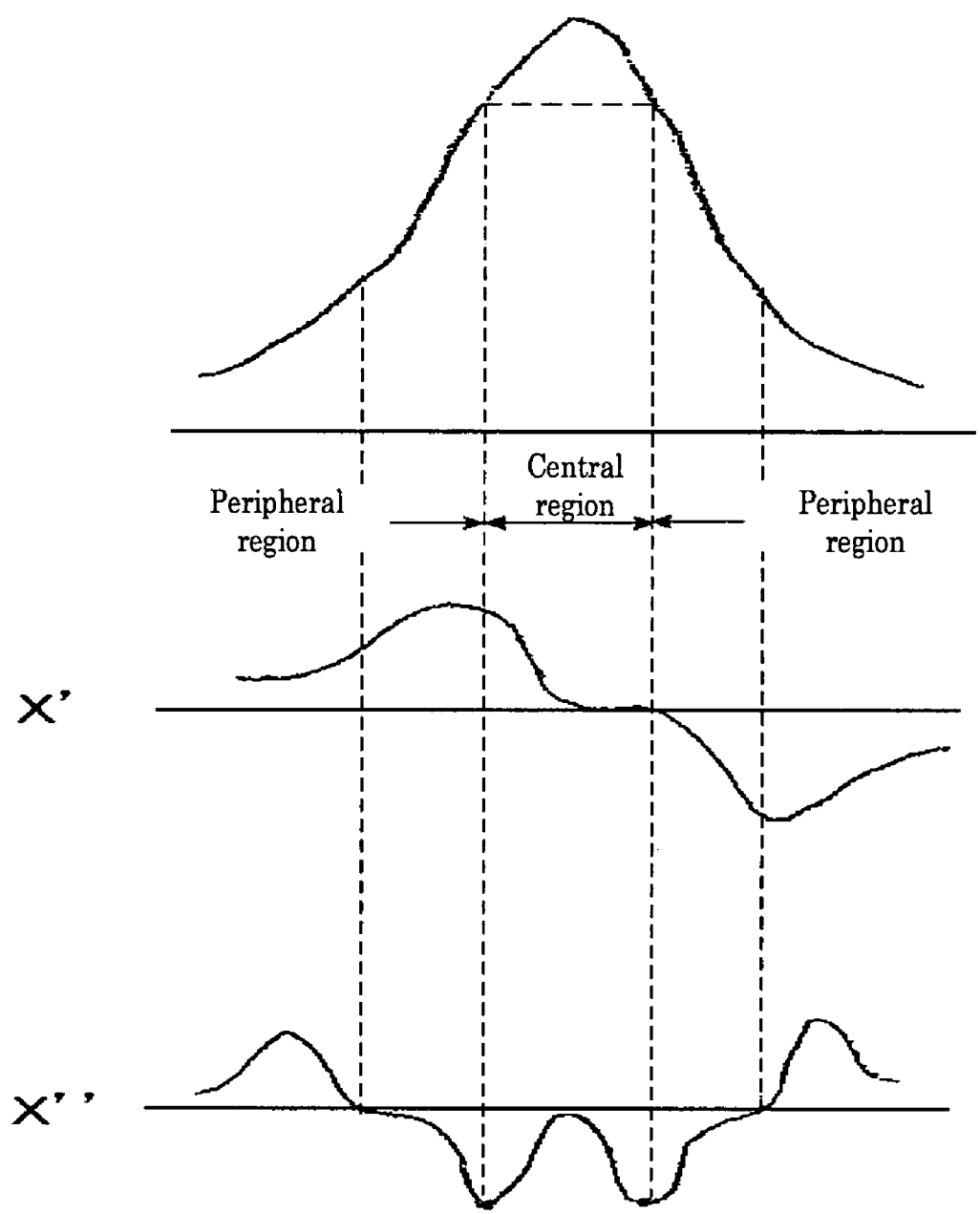

IMAGE PROCESSING METHOD AND IMAGE PROCESSING APPARATUS

BACKGROUND OF THE INVENTION

1. Field of the Invention

The present invention relates to an image processing method which offers excellent image erasability by being capable of expanding image recording and image erasing areas, ensuring sufficient image-erasing time and complete image erasing, and to an image processing apparatus using the image processing method.

2. Description of the Related Art

A non-contacting laser based method is proposed as a method of creation or deletion of an image on or from a thermoreversible recording medium (hereinafter referred to as "reversible thermal sensitive medium," "recording medium," or "medium" in some cases) whose surface has irregularities and as a method of creation or deletion of an image on such a medium at a distance (see Japanese Patent Application Laid-Open (JP-A) No. 2000-136022). This method adopts non-contacting recording on shipping containers used for distribution of goods, wherein the containers are formed of a thermoreversible recording medium, a laser is used for recording (writing) of image, and hot blast, heated water, infrared heaters, or the like are used to erase the image.

There are various proposed methods that involve laser irradiation for recording/erasing of image on/from such thermoreversible recording media (see for instance JP-A No. 07-186555 (Japanese Patent (JP-B) No. 3350836), JP-A No. 07-186445 (JP-B No. 3446316), JP-A No. 2002-347272, and JP-A No. 2004-195751).

The technique disclosed in JP-A No. 07-186555 (JP-B No. 3350836) is an improved method for image formation and erasing that involves formation or erasing of image on or from a thermoreversible recording medium by utilizing heat generated by irradiation of a photothermal conversion sheet placed on the medium with a laser beam. The Specification of the Patent Literature discloses that formation and erasing of image is possible by controlling the condition for laser beam irradiation. More specifically, it is stated that it is possible to control a heating temperature to a first specified temperature and a second specified temperature for the thermoreversible recording medium by controlling at least one of light irradiation time, light intensity, degree of focusing and light intensity distribution, and that it is possible to form or erase an image or partially entirely by changing the cooling rate after heating.

JP-A No. 07-186445 (JP-B No. 3446316) discloses a method that uses two laser beams: one as an oval or oblong laser spot for image erasing, and one as a circular laser spot for image formation, a method for recording using a composite beam of two lasers, and a method for recording using a composite beam of two transformed lasers. Two laser-recording can realize high-density image formation compared to one laser-recording.

The technique disclosed in JP-A No. 2002-347272 is directed to utilize during image recording or erasing both sides of a mirror to change the shape of the focused laser beam spot according to the differences in optical paths and/or mirror shape, whereby it is possible to change the size of a beam spot or to make the beam out of focus with a simple optical system.

Furthermore, JP-A No. 2004-195751 discloses that almost all the ghost images remained after image erasing can be removed by setting the laser absorbance of a label-shaped reversible thermosensitive recording medium to 50% or more, irradiation energy during printing to 5.0 mJ/mm$^2$ to 15.0 mJ/mm$^2$, a product of laser absorbance and irradiation energy for print to 3.0 mJ/mm$^2$ to 14.0 mJ/mm$^2$ and a product of laser absorbance upon erasing and irradiation energy for print to 1.1 folds to 3.0 folds.

In addition, a method of erasing of an image using a laser beam is proposed (see JP-A No. 2003-246144), wherein recording of a clear-contrast image of high durability is said be realized on reversible thermosensitive recording media by erasing previous one at levels (laser beam energy, laser irradiation time, scanning speed and pulse width) that are 25% to 65% of those for laser recording.

Laser printing and laser erasing can be performed by the methods described above. However, in cases where an image is printed on or erased from a thermoreversible recording medium extensively and where a thermoreversible recording medium is attached to a delivery container used for distribution lines for non-contact recording thereon, it results in failure to achieve complete image recording, in particular image erasing, due to energy shortage in the laser beam, depending on the distance between the medium and the laser source-equipped image recording apparatus and/or on the passing speed of the medium on the line.

There are proposed methods for solving the foregoing problems that involve use of an apparatus capable of focus control, wherein the laser beam energy level is independent of the distance between the thermoreversible recording medium and the laser source-equipped image recording apparatus. For example, Japanese Utility Model Application Laid-Open (JP-U) No. 56-27936 and Japanese Patent Application Laid-Open (JP-A) No. 58-83812 (Japanese Patent Application Publication (JP-B) No. 03-81133) disclose focus controlling by deforming a mirror. With this method the foregoing problems can be solved.

The methods described above, however, has a problem of requiring a special device for mirror deformation and thus cannot be applied to general laser devices.

BRIEF SUMMARY OF THE INVENTION

An object of the present invention is to provide an image processing method and an image processing apparatus, each of which is capable of ensuring sufficient image-erasing time by expanding image-recording and image-erasing areas and of complete image erasing.

The means for solving the foregoing problems are as follows.

<1> An image processing method including at least one of:

recording an image on a thermoreversible recording medium by heating the thermoreversible recording medium by application of a laser beam thereon; and erasing an image from a thermoreversible recording medium by heating the thermoreversible recording medium by application of a laser beam thereon, wherein the laser beam is parallel light and the laser scanning speed for the peripheral region surrounding the central region of the optical axis of the laser beam is lower than the laser scanning speed for the central region, and wherein the thermoreversible recording medium offers temperature-dependent reversible changes in transparency or color tone.

<2> An image processing method including at least one of:

recording an image on a thermoreversible recording medium by heating the thermoreversible recording medium by application of a laser beam thereon; and erasing an image from a thermoreversible recording medium by heating the thermoreversible recording medium by application of a laser beam thereon, wherein the laser beam is parallel light and the laser output for the peripheral region surrounding the central region of the optical axis of the laser beam is greater than the output for the central region, and wherein the thermoreversible recording medium offers temperature-dependent reversible changes in transparency or color tone.

<3> An image processing method including at least one of:

recording an image on a thermoreversible recording medium by heating the thermoreversible recording medium by application of a laser beam thereon; and erasing an image from a thermoreversible recording medium by heating the thermoreversible recording medium by application of a laser beam thereon, wherein the laser beam is parallel light, and an overlapping area between a laser irradiation area that corresponds to a peripheral region surrounding a central region of the optical axis of the laser beam and a nearby laser irradiation area is larger than an overlapping area between a laser irradiation area that corresponds to the central region and the nearby laser irradiation area, and wherein the thermoreversible recording medium offers temperature-dependent reversible changes in transparency or color tone.

<4> The image processing method according to any one of <1> to <3>, wherein the laser beam energy level for the peripheral region surrounding the central region of the optical axis of laser beam is equal to or greater than the laser beam energy level for the central region.

<5> The image processing method according to any one <1> to <4>, wherein the central region correspond to a laser irradiation area on the thermoreversible recording medium, which the area is formed by a laser beam applied from a laser source to the thermoreversible recording medium at right angle to a surface thereof <6> The image processing method according to any one <1> to <5>, wherein the peripheral region corresponds to any area other than the central region of the optical axis of a laser beam applied to the thermoreversible recording medium by a scan control unit of an image processing apparatus.

<7> The image processing method according to any one <1> to <6>, wherein the distance through which the laser beam travels to the thermoreversible recording medium is optionally determined.

<8> The image processing method according to any one <1> to <7>, wherein the thermoreversible recording medium comprises at least a reversible thermosensitive recording layer formed over a support, and the reversible thermosensitive recording layer contains a resin and a low-molecular-weight organic substance.

<9> The image processing method according to any one <1> to <7>, wherein the thermoreversible recording medium comprises at least a reversible thermosensitive recording layer formed over a support, and the reversible thermosensitive recording layer contains a leuco dye and a reversible developer.

<10> The image processing method according to any one <1> to <9>, wherein in the light intensity distribution of the laser beam in its cross section cut along a direction substantially orthogonal to the beam travel direction, the intensity of the central region is equal to or less than the intensity of the peripheral region.

<11> The image processing method according to any one <1> to <10>, wherein the image processing method is used for at least one of recording and erasing of an image on and from a container being transferred on a distribution line in a delivery support system.

<12> An image processing apparatus including:

a laser beam application unit; and a light intensity adjusting unit configured to change the light intensity of a laser beam, the light intensity adjusting unit being placed at the laser emission side of the laser beam application unit, wherein the image processing apparatus is used in an image processing method according to any one <1> to <11>.

<13> The image processing apparatus according to <12>, wherein the light intensity adjusting unit is at least one of a lens, a filter, and a mirror.

The first aspect of the image processing method of the present invention includes at least one of an image recording step and an image erasing step, wherein a laser beam is parallel light and the laser scanning speed for the peripheral region surrounding the central region of the optical axis of the laser beam is lower than the laser scanning speed for the central region.

The second aspect of the image processing method of the present invention includes at least one of an image recording step and an image erasing step, wherein a laser beam is parallel light and the laser output for the peripheral region surrounding the central region of the optical axis of the laser beam is greater than the output for the central region.

The third aspect of the image processing method of the present invention includes at least one of an image recording step and an image erasing step, wherein a laser beam is parallel light and the overlapping area between a laser irradiation area that corresponds to a peripheral region surrounding a central region of the optical axis of the laser beam and a nearby laser irradiation area is larger than the overlapping area between a laser irradiation area that corresponds to the central region and the nearby laser irradiation area.

In the image processing method according to any one the first to third aspects of the present invention, a laser beam is parallel light, and the laser scanning speed for the peripheral region surrounding the central region of the optical axis of the laser beam is lower than the laser scanning speed for the central region, the laser output for the peripheral region is greater than the output for the central region, or an overlapping area between a laser irradiation area that corresponds to a peripheral region surrounding a central region of the optical axis of the laser beam and a nearby laser irradiation area is larger than an overlapping area between a laser irradiation area that corresponds to the central region and the nearby laser irradiation area. Thus, even when parallel light like a defocused beam is used, it is possible to uniformly impart laser beam energy to the medium regardless of the beam's position on the medium, to achieve extensive printing by expanding an area to be printed, to ensure sufficient time available for image erasing, and to achieve complete image-erasing.

The image processing apparatus of the present invention is used in the image processing method of the present invention and comprises at least a laser application unit and a laser beam adjusting unit which is configured to change the light intensity of a laser beam and which is placed at the laser emission side of the laser beam application unit.

In the image processing apparatus, the laser application unit emits a laser beam, and the laser beam adjusting unit changes the light intensity of the laser emitted from the laser application unit. As a result, the degradation of a thermoreversible recording medium due to repetitive cycles of image recording and image erasing can be effectively prevented.

BRIEF DESCRIPTION OF THE SEVERAL VIEWS OF THE DRAWINGS

FIG. 6A is a schematic explanatory diagram showing an example of light intensities of "central region" and "peripheral regions" in the light intensity distribution in the beam cross section of a laser beam used in the image processing method of the present invention, the cross section cut along a direction orthogonal to the traveling direction of the beam.

FIG. 6E is a schematic diagram showing an example of light intensities of "central region" and "peripheral regions" in the light intensity distribution (Gaussian distribution) in the beam cross section of a general laser beam used in the image processing method of the present invention, the cross section cut along a direction orthogonal to the traveling direction of the beam.

DETAILED DESCRIPTION OF THE INVENTION

The image processing method according to any one of the first to third aspects of the present invention includes at least one of an image recording step and an image erasing step, and where necessary, further includes additional step(s) selected appropriately.

The image processing method of the present invention encompasses an embodiment in which both image formation and image erasing are performed, an embodiment in which only image formation is performed, and an embodiment in which only image erasing is performed.

In the first aspect of the image processing method of the present invention, in at least one of the image recording step and image erasing step, a laser beam is parallel light and the laser scanning speed for the peripheral region surrounding the central region of the optical axis of the laser beam is lower than the laser scanning speed for the central region.

In the second aspect of the image processing method of the present invention, in at least one of the image recording step and image erasing step, a laser beam is parallel light and the laser output for the peripheral region surrounding the central region of the optical axis of the laser beam is greater than the output for the central region.

In the third aspect of the image processing method of the present invention, in at least one of the image recording step and image erasing step, a laser beam is parallel light, and an overlapping area between a laser irradiation area that corresponds to a peripheral region surrounding a central region of the optical axis of the laser beam and a nearby laser irradiation area is larger than an overlapping area between a laser irradiation area that corresponds to the central region and the nearby laser irradiation area.

In at least one of the image recording step and image erasing step of the present invention, parallel light is used, and the beam is so adjusted that its energy level is uniform over the medium regardless of the angle between the output laser beam and the normal to the medium's surface.

Figure 5:
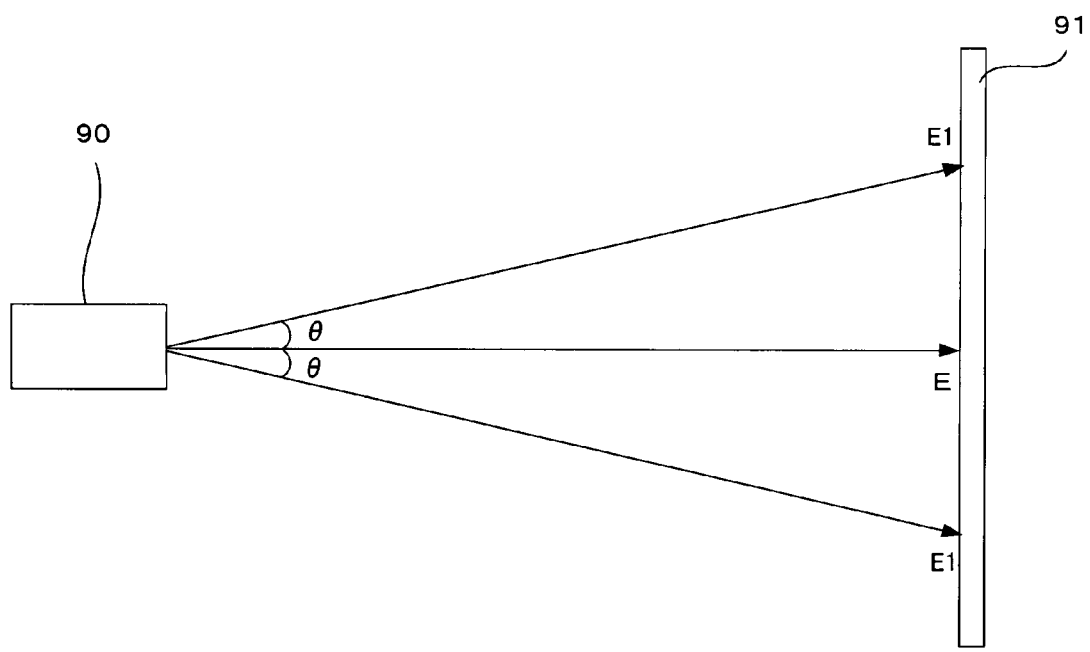
FIG. 5 is an explanatory diagram of the principle of the image processing method of the present invention.
Figure 6B:
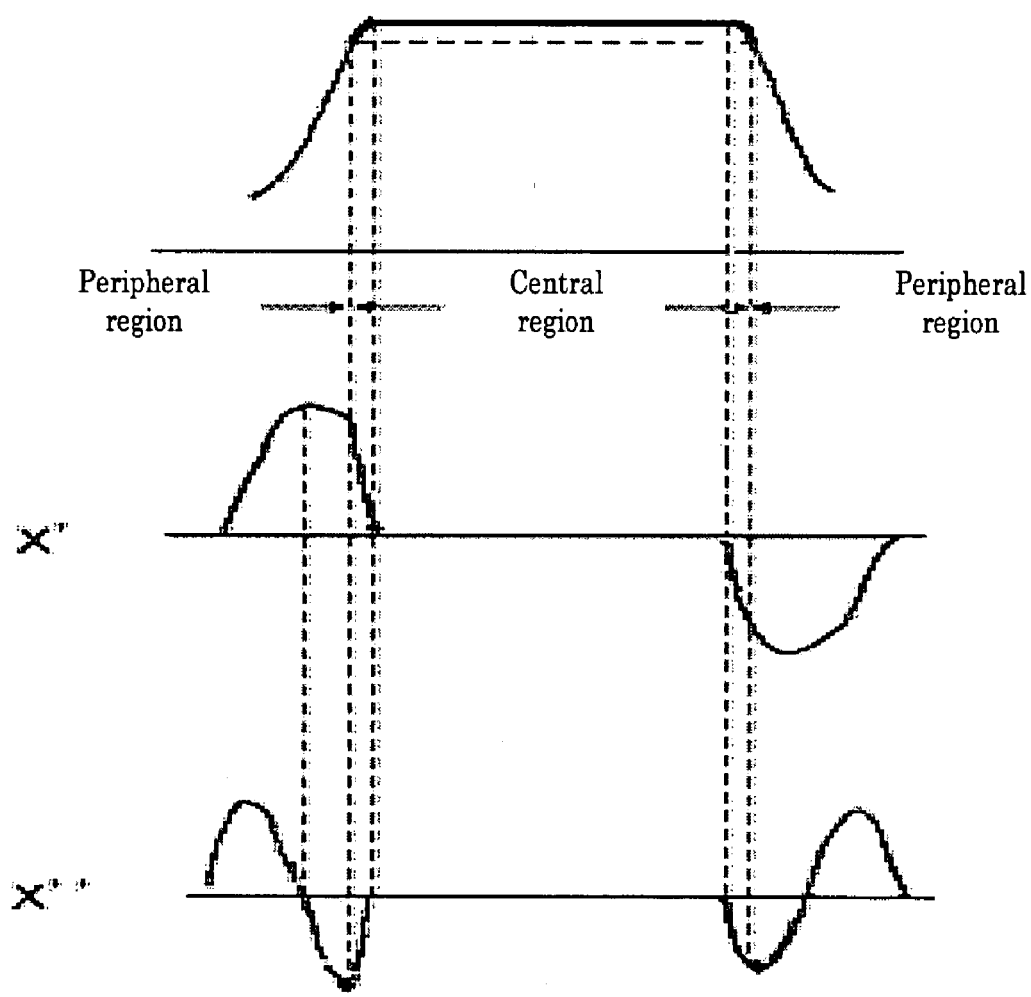
FIG. 6B is a schematic explanatory diagram showing another example of light intensities of "central region" and "peripheral regions" in the light intensity distribution in the beam cross section of a laser beam used in the image processing method of the present invention, the cross section cut along a direction orthogonal to the traveling direction of the beam.
Figure 6C:
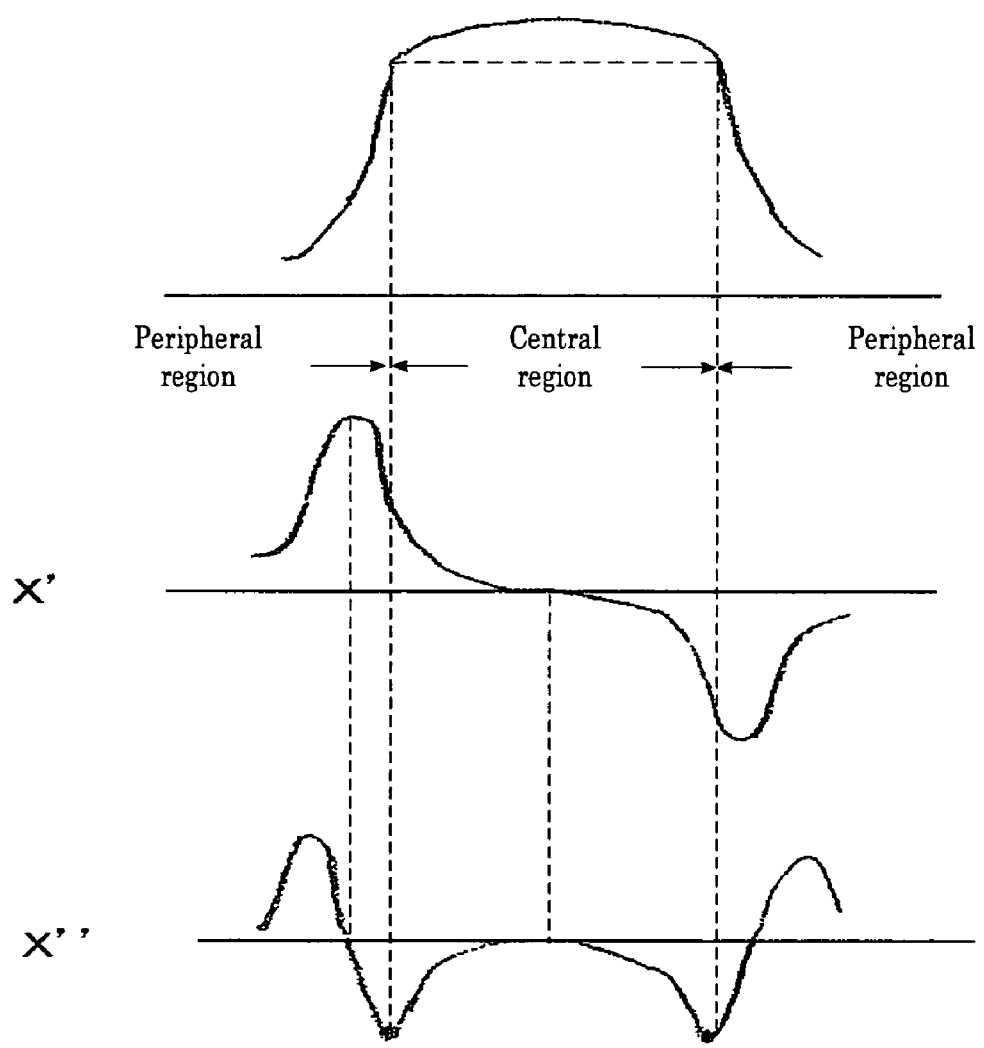
FIG. 6C is a schematic explanatory diagram showing a still another example of light intensities of "central region" and "peripheral regions" in the light intensity distribution in the beam cross section of a laser beam which is used in the image processing method of the present invention, the cross section cut along a direction orthogonal to the traveling direction of the beam.
Figure 6D:
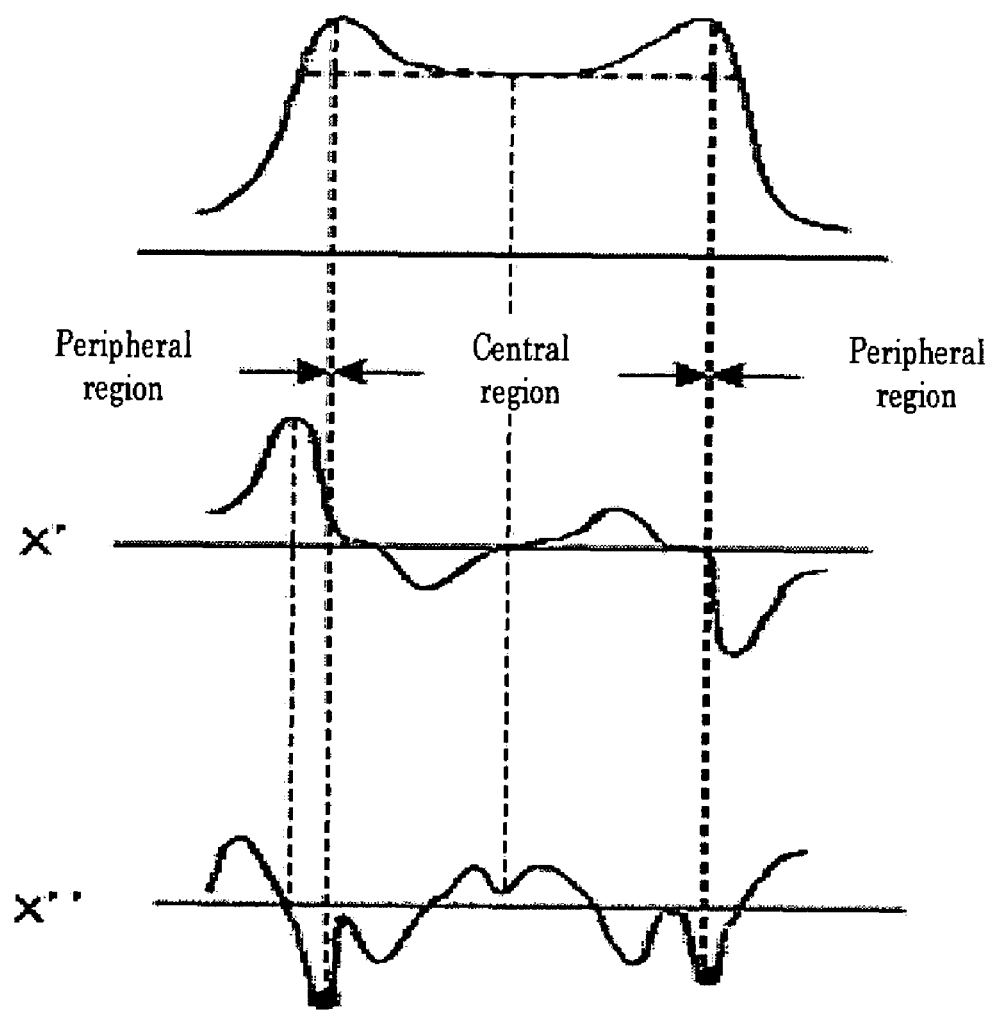
FIG. 6D is a schematic explanatory diagram showing a yet another example of light intensities of "central region" and "peripheral regions" in the light intensity distribution in the beam cross section of a laser beam used in the image processing method of the present invention, the cross section cut along a direction orthogonal to the traveling direction of the beam.

For example, as shown in FIG. 5, while the laser spot of a circular laser beam emitted from the laser head 90 onto the position E of the thermoreversible recording medium 91 has the same shape and nearly the same size as the cross section of the laser beam, the laser spot on the position E1 has an oval shape whose minor axis is equal to that of the cross section of the original laser beam but whose major length is 1/cos θ (where θ is the angle between the output laser beam and the normal to the medium's surface) that of the cross section. Accordingly, the amount of energy per unit area is reduced, and hence the energy level needs to be adjusted to ensure uniform energy application over the medium.

The angle θ—an angle between the output laser beam and the normal to the medium's surface—is preferably 45° or less, more preferably 30° or less. It is difficult to increase this angle because there is a technical limitation with respect to galvanometer mirrors that serve to change the laser emission angle. An image recording step that uses an oval laser beam with a large major axis-to-minor axis ratio results in variations in laser beam line width along the recording direction, and thus a desired image cannot be obtained.

<Image Recording Step and Image Erasing Step>

The image recording step of the image processing method of the present invention is a step wherein a thermoreversible recording medium that offers temperature-dependent changes in transparency or color tone is heated by irradiation with a laser beam to form an image thereon.

The image erasing step of the image processing method of the present invention is a step wherein the thermoreversible recording medium is heated by irradiation with a laser beam to thereby erase the image formed thereon.

By heating the thermoreversible recording medium by applying a laser beam thereto, an image can be recorded on or erased from the medium without involving contact.

In general, in the image processing method of the present invention, image renewal (image erasing step) is first performed at the time when the thermoreversible recording medium is to be used again, followed by recording of a new image thereon by the image recording step. However, it should be noted that the order in which image recording and image erasing are performed is not specifically limited to the order described above; the image recording step may be first performed to record an image, and then the image erasing step may be performed to erase the image.

In the first to third aspects of the present invention, it is preferable that the laser beam energy level for the peripheral region surrounding the central region of the optical axis of laser beam be equal to or greater than the laser beam energy level for the central region; that the central region correspond to a laser irradiation area on a thermoreversible recording medium, which the area is formed by a laser beam applied from a laser source to the medium at right angle to the medium's surface; that the peripheral region corresponds to any area other than the central region of the optical axis of the laser beam applied to the thermoreversible recording medium by the scan control unit of an image processing apparatus; and that the distance through which the laser beam travels to the medium be optionally determined.

In the present invention, an image is formed on or erased from a thermoreversible recording medium by heating it by linearly applying laser beams in parallel at a give distance onto a certain area of the medium, wherein the laser beam is parallel light, and wherein the laser scanning speed for the peripheral region surrounding the central region of the optical axis of the laser beam is lower than the laser scanning speed for the central region, the laser output for the peripheral region is greater than the output for the central region, or the overlapping area between a laser irradiation area that corresponds to the peripheral region and a nearby laser irradiation area is larger than the overlapping area between a laser irradiation area that corresponds to the central region and the nearby laser irradiation area. The image processing method of the present invention is, therefore, capable of relatively uniform application of laser beam energy over the medium regardless of the position of the laser beam applied onto the medium, even when the laser beam is parallel light.

Figure 2:
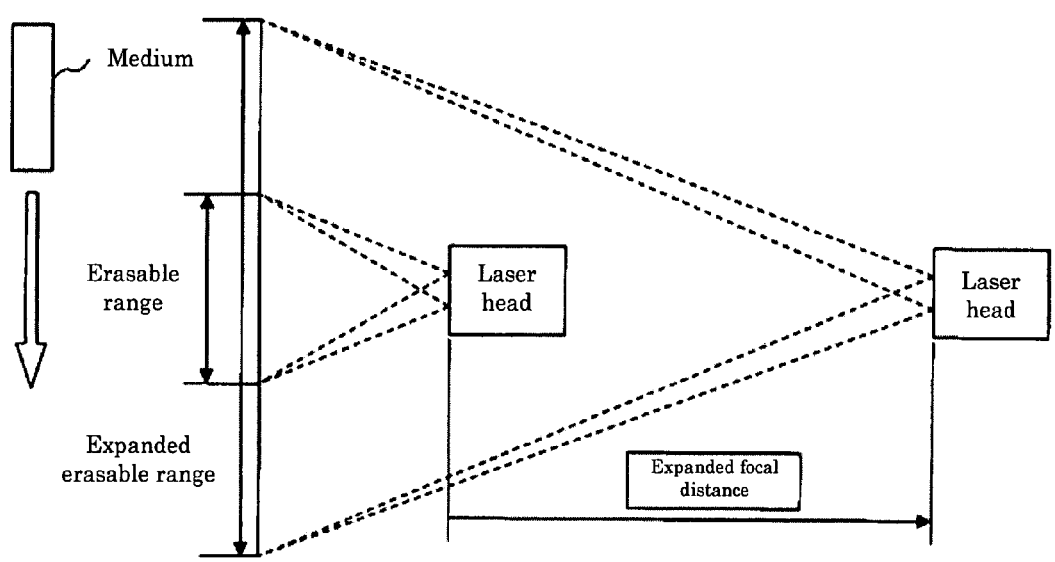
FIG. 2 is an explanatory diagram of the image processing method of the present invention.
Figure 4:
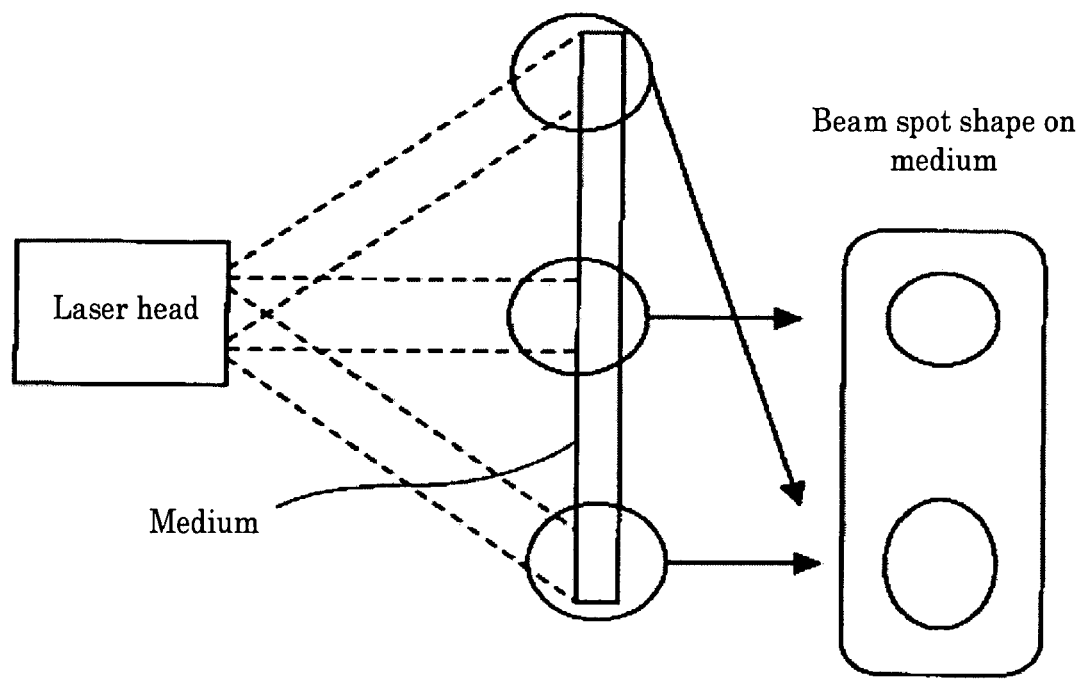
FIG. 4 is an explanatory diagram of the image processing method of the present invention.

The term "central region of the optical axis of laser beam" refers to, as shown in FIG. 4, a laser irradiation area on a thermoreversible recording medium, which the area is formed by a laser beam emitted from a laser head to the medium at right angle to the medium's surface, and the term "peripheral region surrounding the central region" refers to any area of the thermoreversible recording medium other than the central region, which is irradiated with a laser beam by the control of a mirror attached to a laser equipped-image recording apparatus, and the area of the peripheral region is dependent on the distance between the thermoreversible recording medium and the laser source (see FIGS. 2 and 4).

The area of the central region of the optical axis of laser beam varies depending on the spot diameter of a laser beam used, so too does the area of the peripheral region surrounding the central region because it also varies depending on the size of the central region.

Figure 3:
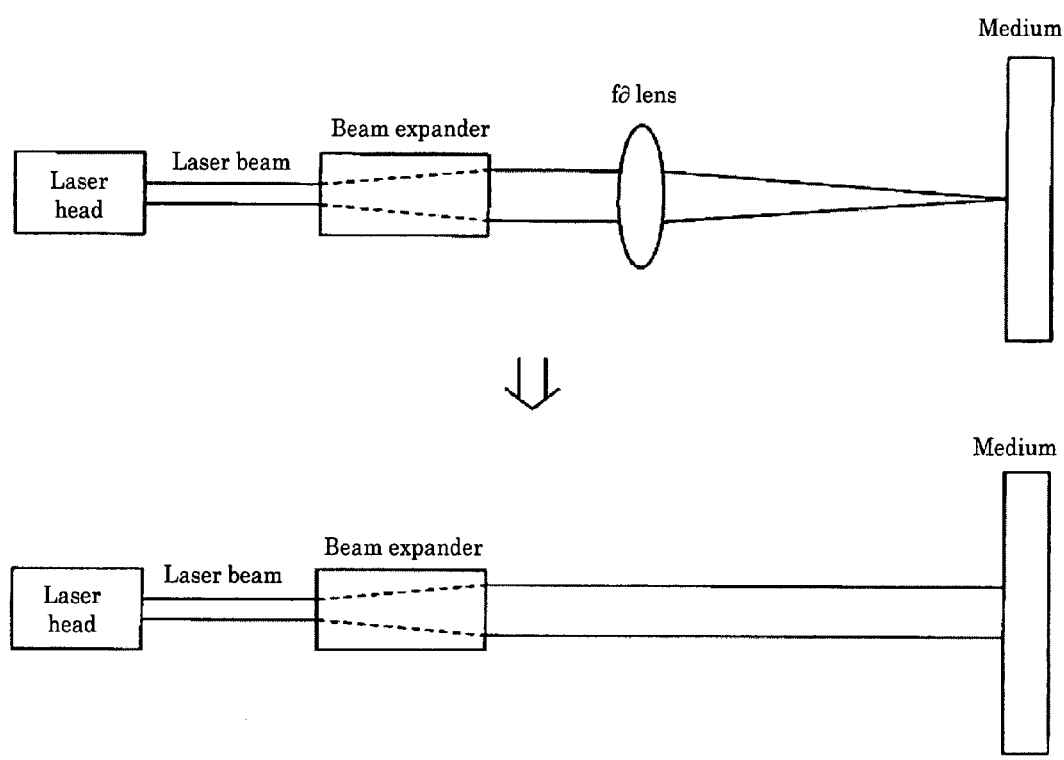
FIG. 3 is an explanatory diagram for the principle of the laser beam used in the image processing method of the present invention.

As shown in FIGS. 3 and 4, the present invention is characterized by using a parallel laser beam or parallel light. As used herein "parallel light" refers to parallel light—so-called collimated light—like that shown in the bottom drawing of FIG. 3, but it may have a slight slope. In that case the slope angle is preferably within ±5 degrees. Note that the "parallel laser beam," "laser beam with a long focal distance" and "defocused laser beam" have the same meaning, but hereinafter, the parallel light used in the present invention is referred to as "a defocused laser beam."

It is only necessary to detach a fθ lens that is provided to a general image recording apparatus in order to create such a defocused laser beam. For example, as shown in the bottom drawing of FIG. 3, the laser beam emitted from the laser source provided to the image recording apparatus is a laser beam amplified by the beam expander and is applied to a thermoreversible recording medium as it is. FIG. 3 is intended to explain the case where the spot diameter of the laser beam from the laser source is to be increased. In the case where the spot diameter is to be reduced, a beam reducer may be used rather than the beam expander, and in the case where there is no need to increase or reduce the spot diameter, an beam expander or other optical systems may not be used. The use of such a laser beam makes it possible to apply parallel light, or a defocused laser beam, over a medium while achieving substantially the same spot diameter thereon regardless of the distance between the laser source and an article to be irradiated with the laser beam, i.e., a thermoreversible recording medium. Furthermore, there is no need to provide such a complex optical system as a fθ lens to the image recording apparatus. For this reason, there is no need to set focal distance in the image processing apparatus of the present invention, and thus the image processing apparatus can be provided at any position according to the distribution line configuration, and in cases where a reversible thermal sensitive medium is attached to a delivery container in distribution lines for non-contact recording, the installment position of the apparatus can be flexibility determined. For example, when a fθ lens that defines the focal distance is provided to the image recording apparatus as shown in FIG. 2, the distance between the thermoreversible recording medium and the laser source never changes, depending on the type of the fθ lens; therefore, a small distance between the laser source and medium results in a small image-erasable area, resulting in failure to ensure sufficient image-erasing time for the thermoreversible recording medium attached to the delivery container moving on the distribution line. The defocused laser beam adopted in the present invention, on the other hand, can change the distance between the laser source and the medium, and therefore, it is possible to increase the distance between them, that is, it is possible to expand the image-erasable area and thus to ensure sufficient image-erasing time for the thermoreversible recording medium attached to the delivery container moving on the distribution line.

Meanwhile, as shown in FIG. 4, the spot shape of the defocused laser beam used in the present invention becomes oval as it moves away from the center of the laser beam vertically emitted from the laser source to the medium, and the beam energy density decreases correspondingly. In the present invention, however, the laser beam energy level for the peripheral region surrounding the central region of the optical axis of laser beam is made equal to or greater than that for the central region. In this way, even when a defocused laser beam is used, it is possible to achieve uniform application of laser beam energy over the medium regardless of the laser beam's position on the medium, i.e., the angle at which the laser beam is emitted from the laser source.

In the present invention, it is therefore possible to apply a constant laser beam energy over an expanded image-erasable area, thereby ensuring sufficient time for image erasing and achieving complete image erasing.

In at least one of the image recording step and image erasing step, a laser beam is applied to the thermoreversible recording medium in such a way that the light intensity of the central region of the light intensity distribution of the laser beam in its cross section cut along a direction substantially orthogonal to the beam travel direction (hereinafter may be referred to as "cross section orthogonal to the beam travel direction) is equal to or less than that of the peripheral regions.

When a certain pattern is to be created with a laser beam, the light intensity distribution of the laser beam in its cross section orthogonal to the beam travel direction generally has a Gaussian profile, wherein the light intensity is extremely higher in the central region than in the peripheral regions of the distribution. When such a laser beam with a Gaussian distribution is applied to the thermoreversible recording medium, the temperature of a portion of the medium corresponding to the central region increases too much, and subsequent cycles of image forming and image erasing causes degradation of that portion, resulting in poor cycle durability of the medium.

When the laser beam energy is reduced so as not to increase the temperature of the medium corresponding to the central region to a level that causes degradation, it results in small image size and a problem of reduced image contrast or prolonged time for image forming.

To avoid these problems, in the image processing method of the present invention, laser irradiation is controlled in at least one of the image formation step and image erasing step so that the light intensity of the central region of the light intensity distribution in its cross section orthogonal to the beam travel direction is equal to or less than that of the peripheral regions, whereby the cycle durability of the thermoreversible recording medium is improved while suppressing its degradation due to cycles of repetitive image formation and image erasing and maintaining image contrast without reducing the image size. Furthermore, when an image is formed or erased by sequential or random sweeping of laser beams in the same direction or alternating directions, the amount of heat accumulated in the turn back areas and/or overlapped portions in laser beam lines in the scanning direction is reduced, whereby excellent cycle durability is achieved.

(Central and Peripheral Regions in the Light Intensity Distribution)

The "central region" in the light intensity distribution in the beam cross section cut along a direction substantially orthogonal to the traveling direction of the laser beam is defined as a region sandwiched by the tops of two maximum negative peaks of a differentiation curve that is obtained by differentiating a curve that represents the light intensity distribution twice, and "peripheral region" is defined as a region other than the "central region."

The "light intensity of the central region" means an intensity corresponding to a peak top of a light intensity distribution when it is expressed by a curved line; when the light intensity distribution has positive peaks, the light intensity of the central region corresponds to a peak top, whereas if it has negative peaks, the light intensity in the central region corresponds to a peak bottom. Furthermore, when the light intensity distribution has both positive and negative peaks, the light intensity in the central region means an intensity corresponding to a peak top that is closer to the center of the central region than are other peaks.

Moreover, when the light intensity of the central region is expressed by a straight line, it means an intensity corresponding to the top of that straight line. In this case, the light intensity is preferably constant in the central region (the light intensity distribution in the central region is preferably expressed by a horizontal line).

The "light intensity of the periphery" means, even when it is expressed by either a curve or a straight line, an intensity corresponding to the top of the curve or straight line.

Examples of light intensities in the "center" and "periphery" regions in the light intensity distribution in the beam cross section are shown in FIGS. 6A to 6E. Each curve in FIGS. 6A to 6E shows, from the top of the drawing, a curve of light intensity distribution, a differentiation curve (X') which is a curve of the light intensity distribution differentiated once, and a differentiation curve (X") which is a curve of the light intensity distribution differentiated twice.

FIGS. 6A to 6E show light intensity distributions of the laser beam used in the image processing method the present invention, wherein the light intensity of the central region is equal to or less than that in the peripheral regions.

FIG. 6E shows a light intensity distribution of a normal laser beam that has a Gaussian profile, wherein light intensity is significantly more intense in the central region than in the peripheral regions.

With regard to the relationship between the light intensities in the central region and the peripheral regions in the above-described light intensity distribution, the light intensity of the central region needs to be equal to or less than the light intensity of the peripheral region. Herein the phrase "equal to or less than" means that light intensity of the central region is 1.05 times or less, preferably 1.03 times or less, and more preferably 1.00 times or less the light intensity of the peripheral regions; the light intensity of the central region is most preferably smaller than the light intensity of the peripheral region, that is, less than 1.0 times.

When the light intensity of the central region is 1.05 times or less the light intensity of the peripheral region, it is possible to alleviate degradation of a thermoreversible recording medium due to temperature rise in the central regions.

In contrast, there is no particular lower limits as to the light intensity of the central region; it may be adjusted appropriately according to the intended purpose. It is preferably 0.1 times or more, and more preferably 0.3 times or more the light intensity of the peripheral region.

When the light intensity of the central region is less than 0.1 times the light intensity of the peripheral region, the temperature of the thermoreversible recording medium at a spot of a laser beam fails to be raised sufficiently, and it may result in reduced image density in the central region compared to the peripheral regions, and in failure to erase images completely.

The light intensity distribution in the beam cross section can be measured using a laser beam profiler equipped with a CCD, etc., in the case where a laser beam is emitted from such a laser source as a laser diode or YAG laser and has a wavelength of near infrared area. Moreover, when the laser beam is emitted from a $CO_2$ laser and has a wavelength of far infrared area, for example, an instrument with a combination of a beam splitter and a power meter, a high-power beam analyzer equipped with a high-sensitive, pyroelectric camera may be used for measurement because no CCD cannot be used.

The method for altering the light intensity distribution in the beam cross section from a Gaussian profile to one in which the light intensity of the central region is equal to or less than that of the peripheral region is not particularly limited and may be selected according to the intended purpose. A light intensity adjusting unit can be suitably used.

Preferred examples of the light intensity adjusting unit include lens, filters, masks, etc. Specifically, kaleidoscopes, integrators, beam homogenizers and aspheric beam shapers (a combination of intensity transformation lens and phase correction lens), etc. are preferable. Moreover, when a filter, mask or the like is used, light intensity may be adjusted by physically cutting through the center of the laser beam. In addition, when a mirror is used, it is possible to adjust the light intensity by use of, for example, a deformable mirror whose shape can be mechanically changed by computer, or a mirror with various values of reflectance or various degrees of surface irregularities.

It is also possible to adjust the light intensity by changing the distance between the thermoreversible recording medium and lens (i.e., focal distance), and in addition, adjustment of light intensity can be readily achieved by using a semiconductor laser, YAG laser and the like that are coupled with fiber. Note that the method for adjusting light intensity by the light intensity adjusting unit will be described in detail along with, the description of the image processing apparatus of the present invention to be described later.

The diameter of the laser spot of laser beam used in the present invention may change depending on the laser output power and/or on the characteristics of thermoreversible recording media, and a suitable diameter is selected depending on the circumstances. The diameter of the laser spot preferably ranges from 0.01 mm to 20 mm.

The diameter of the laser spot for image recording may be different from that of a laser beam for image erasing. In this case, the diameter of the laser spot for image recording is preferably 0.01 mm to 10 mm, more preferably 0.01 mm to 5 mm. Too large a laser spot diameter for image recording results in a large laser output power for heating the media to a given temperature, and therefore, there will be a problem of upsizing image forming apparatus. The diameter of the laser spot for image erasing is preferably 0.1 mm to 20 mm, more preferably 0.2 mm to 15 mm. Erasability increases with increasing diameter of the laser spot for image erasing, erasing time can also be reduced. On the other hand, too large a diameter of the laser spot for image erasing results in a large laser output power for heating the media to a given temperature, and therefore, erasability will be reduced or there will be a problem of upsizing image forming apparatus.

A preferred embodiment of the present invention is that, in an image processing method wherein an image is recorded on or erased from a thermoreversible recording medium, which offers temperature-dependent reversible changes in transparency or color tone, by heating it by application of a defocused laser beam thereto, the laser scanning speed for the peripheral region surrounding the central region of the optical axis of the laser beam emitted from the laser source of an image processing apparatus is lower than the laser scanning speed for the central region. In this way, even with such a defocused laser beam, it is possible to achieve uniform application of laser beam energy over the medium regardless of the laser beam's position on the medium, i.e., the angle at which the laser beam is emitted from the laser source.

Another preferred embodiment of the present invention is that, in an image processing method wherein an image is recorded on or erased from a thermoreversible recording medium, which offers temperature-dependent reversible changes in transparency or color tone, by heating it by application of a defocused laser beam thereto, the laser output for the peripheral region surrounding the central region of the optical axis of the laser beam is greater than the output for the central region. In this way, even with such a defocused laser beam, it is possible to achieve uniform application of laser beam energy over the medium regardless of the laser beam's position on the medium, i.e., the angle at which the laser beam is emitted from the laser source.

Still another preferred embodiment of the present invention is that, in an image processing method wherein an image is recorded on or erased from a thermoreversible recording medium, which offers temperature-dependent reversible changes in transparency or color tone, by heating it by application of a defocused laser beam thereto, the overlapping area between the laser irradiation area that corresponds to a peripheral region surrounding a central region of the optical axis of the laser beam and a nearby laser irradiation area is larger than the overlapping area between the laser irradiation area that corresponds to the central region and the nearby laser irradiation area. In this way, even with such a defocused laser beam, it is possible to achieve uniform application of laser beam energy over the medium regardless of the laser beam's position on the medium, i.e., the angle at which the laser beam is emitted from the laser source.

Accordingly, in the present invention, the defocused laser beam uniformly imparts laser beam energy to a medium regardless of its position on the medium. In particular where a thermoreversible recording medium is attached to a delivery container for distribution lines for non-contact recording thereon, this method makes it possible to record or erase an image on or from the medium without having to stop the delivery of the container, and further to achieve complete image erasing.

Note in the present invention that although the angle at which a laser beam is emitted from the laser source is controlled by the movement of a mirror provided to the image recording apparatus, this may be achieved with an optional means. A maximum area of the peripheral region surrounding the central region of the optical axis of the laser beam emitted from the laser source of the image recording apparatus is dependent on the mirror control characteristics of the image recording apparatus used and on the distance through which the laser beam travels to the medium.

Moreover, the laser scanning speed, laser beam output, and control of the overlapping area between a laser irradiation area and a nearby laser irradiation area are dependent on the parameters of the image recording apparatus used and on the laser beam characteristics, and may be appropriately set. Those skilled in the art may freely change these factors for correction of laser beam control without departing from the scope and spirit of the present invention.

The laser scanning speed in the present invention is preferably 100 mm/sec or more, more preferably 300 mm/sec or more and, still more preferably, 500 mm/sec or more. When the laser scanning speed is less than 100 mm/sec, it takes time to complete image recording or image erasing. The laser scanning speed is preferably 20,000 mm/sec or less, more preferably 15,000 mm/sec or less and, still more preferably, 10,000 mm/sec or less. If the laser scanning speed is greater than 20,000 mm/sec, it may difficult to achieve uniform image recording and image erasing.

The interval between adjacent laser irradiation areas is preferably 1/12 to 1/3 the laser spot diameter, more preferably 1/10 or greater and, still more preferably, 1/8 or greater.

(Image Processing Apparatus)

The image processing apparatus of the present invention is used in the image processing method of the present invention, and includes at least a laser beam application unit and a laser intensity adjusting unit, and where necessary, includes additional unit(s) appropriately selected.

Laser Beam Application Unit

The laser beam application unit is not particularly limited as long as it is capable of application of a laser beam and may be selected according to the intended purpose; examples include normally used lasers such as $CO_2$ laser, YAG laser, fiber laser and laser diode (LD).

The wavelength of the laser beam emitted from the laser beam application unit is not particularly limited and can be adjusted according to the intended purpose; wavelength is preferably selected from the visible region to infrared region, and more preferably in the near-infrared region to far-infrared region in order to improving image contrast.

A wavelength of in the visible region may result in the reduction of contrast because an additive that generates heat upon absorption laser beam is colored as a result of image formation and erasing in the thermoreversible recording medium.

The wavelength of the laser beam emitted from the $CO_2$ laser is 10.6 μm, a wavelength in the far-infrared region, and the thermoreversible recording medium absorbs the laser beam, thereby eliminating the need to add any additive that absorbs laser beam to generate heat for image formation and erasing on the thermoreversible recording medium. Moreover, because the additive may also absorb the visible light to some extents even when a laser beam having a wavelength of the near-infrared region is used, a $CO_2$ laser which can eliminate the need to add such an additive is advantageous in that it is possible to prevent reduction in image contrast.

Since the wavelength of the laser beams from YAG laser, fiber laser and laser diode is in the visible region to near-infrared region (several hundred micrometers to 1.2 μm) and since current thermoreversible recording media do not absorb any laser beam of wavelengths in that region, it becomes necessary to add photothermal conversion material that absorbs light and coverts it to heat. However, the use of these lasers is advantageous because formation of high-resolution images can be made possible because of shorter wavelengths.

Moreover, since the YAG laser and fiber laser are of high power, they are advantageous in that it is possible to increase both the image formation speed and image erasing speed. Since the laser diode itself is small in size, it is advantageous in achieving downsizing of apparatus, and furthermore, in reducing their prices.

Light Intensity Adjusting Unit

The light intensity adjusting unit has a function to change the light intensity of the laser beam.

The arrangement of the light irradiation adjusting unit is not particularly limited as long as it is placed at the laser emission side of the laser beam application unit, and the distance between the light intensity adjusting unit and the laser beam application unit can be appropriately set depending on the intended purpose.

The light intensity adjusting unit preferably has a function to change the light intensity in such a way that the light intensity of the central region is equal to or less than that of the peripheral region in the light intensity distribution of the laser beam, a distribution in a cross section obtained by cutting through the beam in a direction substantially orthogonal to the traveling direction of the laser beam. The degradation of the thermoreversible recording medium due to repetitive cycles of formation and erasing of image can be suppressed and cycle durability can be improved while keeping image contrast constant.

Meanwhile, the detail of the relationship between the light intensity of the central region and the light intensity of the periphery in the light intensity distribution of cross-section in a direction approximately orthogonal to the traveling direction of the laser beam is as described above.

The light intensity adjusting unit is not particularly limited and may be selected accordingly; preferred examples thereof include lens, filters and masks. Specifically, kaleidoscopes, integrators, beam homogenizers and aspheric beam shapers (a combination of intensity transformation lens and phase correction lens) may be suitably used for example, the light intensity can be adjusted by physically cutting the center of the laser beam with a filter, mask, etc. In addition, when a mirror is used, it is possible to adjust the light intensity by use of, for example, a deformable mirror whose shape can be mechanically changed by computer, or a mirror with various values of reflectance or various degrees of surface irregularities.

Furthermore, it is possible to change the light intensity of the central region such that it become equal to or less than the light intensity of the peripheral regions by adjusting the distance between the thermoreversible recording medium and the fθ lens. In other words, as the distance between the thermoreversible recording medium and fθ lens (i.e., focal distance) is changed, the light intensity distribution in the beam cross section can be changed from a Gaussian distribution to one in which the light intensity of the central region is diminished.

In addition, adjustment of light intensity can be easily achieved by fiber-coupling of laser diode, YAG laser, and the like.

An example of a method for adjusting light intensity using an aspheric beam shaper as the light intensity adjusting unit will be described below.

Figure 7A:
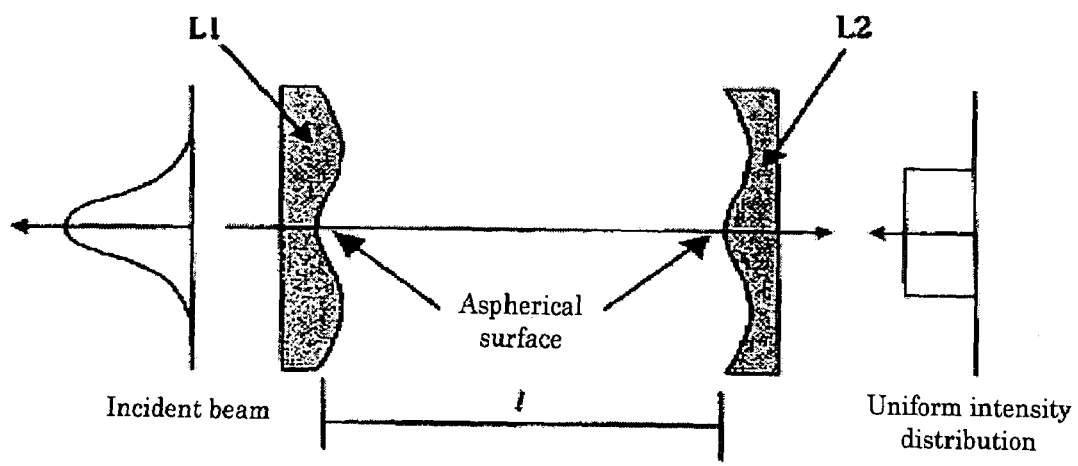
FIG. 7A is a schematic explanatory diagram showing an example of a light intensity adjusting unit in the image processing apparatus of the present invention.

When a combination of an intensity change lens and a phase correction lens is used for example, two aspheric lenses are arranged in the light path of the laser beam from the laser beam unit as shown in FIG. 7A. The light intensity is then changed by the first aspheric lens L1 at a target position (distance 1) so as to make the light intensity of the central region of the beam to be equal to or less than (flat top shape in FIG. 7A) the light intensity of the peripheral region of the laser in its light intensity distribution. Phase correction is performed by the second aspheric lens L2 for parallel propagation of the intensity-changed laser beam. As a result, the light intensity distribution, which has a Gaussian profile, can be changed.

Figure 7B:
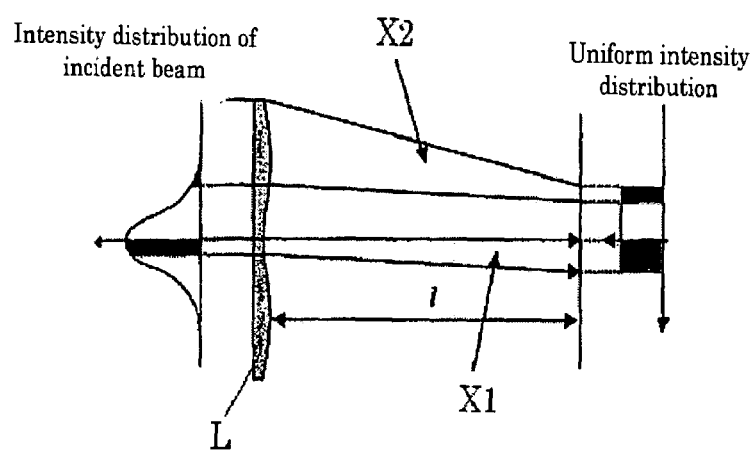
FIG. 7B is a schematic explanatory diagram showing another example of a light intensity adjusting unit in the image processing apparatus of the present invention.

Furthermore, only an intensity alternation lens L may be arranged in the light path of the laser beam emitted from the laser beam application unit as shown in FIG. 7B. In this case, the light intensity of the central region can be altered so as to be equal to or less than (flat top shape in FIG. 7B) the light intensity of the peripheral regions by scattering the incoming laser beam that has an intensity distribution with a Gaussian profile in an area where intensity is high (inside) as shown by arrow X1 and by focusing the incoming laser beam in an area where intensity is low (outside) as shown by arrow X2.

Furthermore, an example of a method for adjusting light intensity by use of a combination of a fiber coupled laser diode and a lens as the light intensity adjusting unit will be described below.

With a fiber coupled laser diode, the light intensity distribution of the laser beam emitted from the fiber end differs in shape from the Gaussian distribution and has a shape that is intermediate between the Gaussian distribution and the flat-top shape because the laser beam propagates through fiber while being repetitively reflected by the fiber. In order to for the above-noted light intensity distribution to have a flat-top shape, a combination of multiple convex lenses and/or concave lenses is attached to the fiber end as a focusing optical system. The image processing apparatus of the present invention is similar in basic configuration to the one that is generally called a laser marker except that the former includes at least the foregoing laser beam application unit and light intensity adjusting unit. The image processing apparatus of the present invention further includes at least a transmission unit, a power control unit and a program unit.

Figure 1:
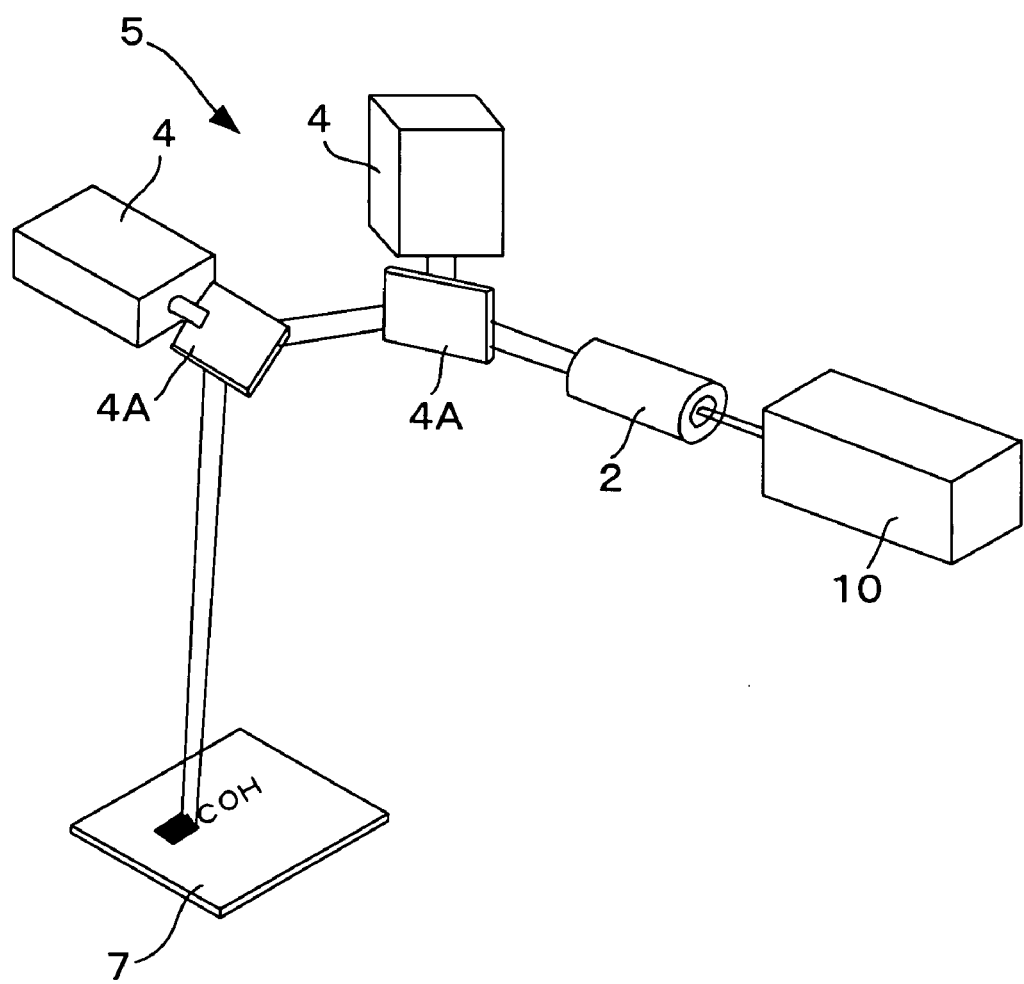
FIG. 1 shows an example of the image processing apparatus of the present invention.

An example of the image processing apparatus of the present invention is shown in FIG. 1, with a primary focus on the laser beam application unit.

In the image processing apparatus shown in FIG. 1, as the light intensity adjusting unit, a mask (not shown) which cuts through the center of a laser beam is placed in the light path of a laser marker equipped with a $CO_2$ laser source with an output power of 40 W (LP-440 by Sunx Ltd.), so that it is made possible to adjust the light intensity distribution of the laser beam in its cross section, which is cut along a direction orthogonal to its traveling direction, in such a way that the central region of the laser beam differs in light intensity from the peripheral regions.

The specification of the laser beam application unit, or the image recording/image erasing head, is as follows:

Possible laser output range: 0.1 W to 40 W
Head movable range: no limit
Spot diameter: 0.18 mm to 10 mm
Scanning speed: max. 12,000 mm/s
Irradiation range: no limit The oscillation unit is composed, for example, of a laser oscillator 10, a beam expander 2, a scanning unit 5 and a fθ lens 6.

The laser oscillator 10 is a necessary unit for obtaining a laser beam of high intensity and high directivity. For example, a mirror is placed on both sides of the laser medium, and the laser medium is pumped (supplied with energy) to generate an induced emission by increasing the number of excited atoms to create an inverted population. A beam of light that oscillates only in an optical axis direction is selectively amplified, thereby increasing the directivity of light and emitting a laser beam from the output mirror.

The scanning unit 5 is composed of galvanometers 4 each having a mirror 4A attached to it. The two mirrors 4A that are respectively oriented in X and axis direction and Y axis direction are so configured that they are rotated at a high speed to thereby cause a laser beam emitted from the laser oscillator 10 to be applied over a thermoreversible recording medium 7 for image recording or erasing.

The power control unit is composed of (1) a power source for electric discharge (in the case of $CO_2$ laser) or a power source for driving a laser source (YAG laser, etc.) which excites a laser medium, (2) a power source for driving galvanometers, (3) a power source for cooling a Peltier-element, etc. (4) a control unit for controlling the image processing apparatus as a whole, etc.

The program unit is a unit which receives conditions such as laser beam intensity and laser scanning speed, etc. and creates and edits characters or the like to be recorded for image forming and erasing, through touch panel input or key board input.

The laser beam application unit, or the image recording/erasing head, is mounted to the image processing apparatus, and the image processing apparatus is also equipped with a transfer unit for thermoreversible recording media, a control unit for the transfer unit, a monitor (touch panel), etc.

A high-contrast image can be created or erased repeatedly at high speed on or from a thermoreversible recording medium such as a label attached to a container like cardboard without involving contact, and the degradation of the thermoreversible recording medium by repetitive cycles of image formation or erasing operations can be suppressed by the image processing method and image processing apparatus of the present invention. Thus the image processing method and image processing apparatus of the present invention are particularly suitable for use in distribution/delivery systems. In such applications, for example, images can be created or erased on or from the label during the transportation of cardboard by the belt conveyer, thereby shortening the shipment time because there is no need to stop the line. Moreover, the cardboard to which the label has been attached can be reused as it is without having to peel off the label for another image erasing or recording cycle.

Furthermore, degradation of the thermal reversible recording medium due to repetitive cycles of image formation and erasing can be effectively suppressed because the image processing apparatus has the light intensity adjusting unit which alters the light intensity of a laser beam.

<Image Formation and Erasing Mechanism>

The mechanism by which an image is formed or erased is of two types: transparency is changed in a reversible manner depending on the temperature; and color tone is changed in a reversible manner depending on the temperature.

In the former case, the foregoing low-molecular-weight organic substance in the thermoreversible recording medium is dispersed in the foregoing resin in the form of particles and transparency is changed in a reversible manner between clear state and clouded state depending on the temperature.

The visible change in transparency is originated with the following phenomena: (1) in clear state, since the particles of the low-molecular-weight organic substance dispersed in the resin base material are attached firmly to the particles of the resin base material with no spaces between them, the incoming light from one side is transmitted to the other side without being scattered; therefore, the medium looks transparent; and (2) In clouded state, on the other hand, since the particles of the low-molecular-weight organic substance are formed of their microscopic crystals and there are gaps (airspaces) in the interface between the crystals or the interface between the particles of the low-molecular-weight organic substance and the particles of the resin base material, whereby the incoming light from one side is refracted and scattered in the interface between the airspaces and crystals or the interface between the airspaces and the resin particles; therefore, the medium looks white.

Figure 8A:
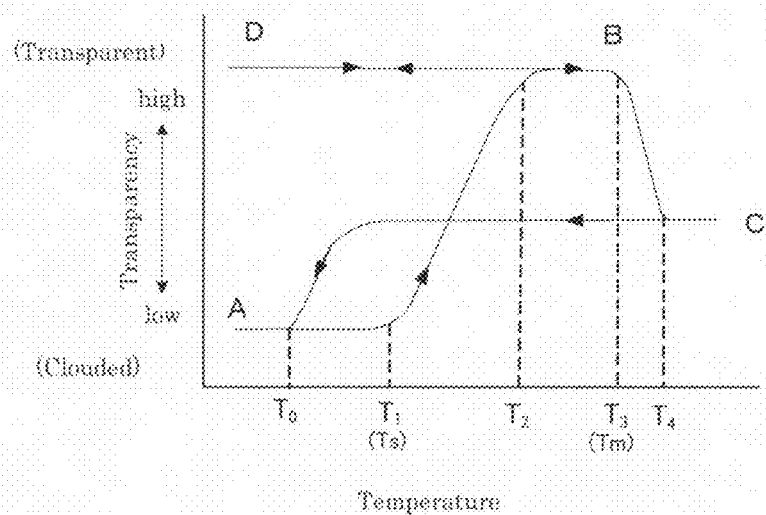
FIG. 8A is a graph showing clear-clouded characteristics of a thermoreversible recording medium.

First, an example of a temperature-transparency conversion curve of the thermoreversible recording medium containing a reversible thermosensitive recording layer (hereinafter may be referred to as "recording layer") made of the foregoing resin in which the foregoing low-molecular-weight organic substance is dispersed is shown in FIG. 8A.

The recording layer is in a clouded opaque state (A) at room temperature of $T_0$ or less, for example. When the layer is heated, it gradually begins to turn transparent at a temperature $T_1$, it becomes transparent (B) when heated to a temperature ranging from $T_2$ to $T_3$ and it stays transparent (D) even it is returned to the room temperature $T_0$ or less again from the transparent (B) state. This is considered to be due to the following phenomenon: the resin starts to get soften around the temperature $T_1$ and shrinks as it continues to be softened, reducing the number of interfaces between the resin particles and the particles of the low-molecular-weight organic substance or the number of the airspaces inside the particles, whereby transparency increases gradually; meanwhile the low-molecular-weight organic substance is in a half-molten state at temperatures $T_2$ to $T_3$ and it becomes transparent by filling the remaining airspaces with particles of the low-molecular-weight organic substance, and when it is cooled with seed crystals left, they undergo crystallization at a relatively high temperature; and since the resin is still in a softened state at this time, the resin follows the volume change of the particles associated with crystallization and no airspaces appear, whereby clear state is maintained.

When the recording layer is further heated to the temperature $T_4$ or higher, it becomes half-transparent (C), an intermediate state between maximum transparent and maximum opaque states. When the temperature is lowered, it returns to the initial clouded opaque state (A) without returning its clear state again. This is considered to be because the recording layer is in an excessively-cooled state after the low-molecular-weight organic substance is completely melted at temperature of $T_4$ or higher and is crystallized at a temperature slightly higher than $T_0$, and the resin cannot follow the volume change of the particles associated with crystallization, allowing airspaces to appear.

However, in the temperature-transparency conversion curve shown in FIG. 8A, transparency in each state may change according to the type of the resin, low-molecular-weight organic substance, etc.

Figure 8B:
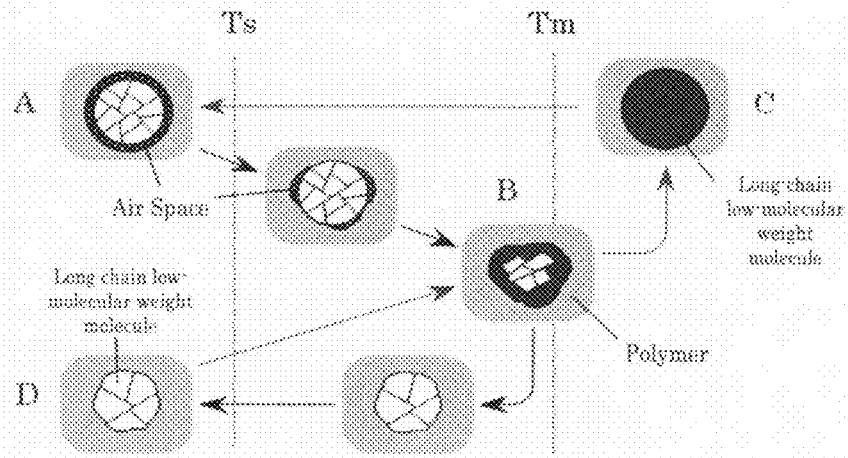
FIG. 8B is a schematic explanatory diagram showing the mechanism by which a thermoreversible recording medium changes between clear state and clouded state.

The mechanism by which the transparency of the thermoreversible recording medium changes is shown in FIG. 8B, the thermoreversible recording medium being turned transparent (clear) or clouded in a reversible manner on heating.

In FIG. 8B, one long-chain low-molecular-weight particle and surrounding polymers are taken out, showing how an airspace appears and disappears upon heating and cooling. In clouded state (A), an airspace appears between a high-molecular-weight particle and a low-molecular-weight particle (or inside the particle), forming light-scattering state. When the particles are heated to a level greater than the softening point (Ts) of the high-molecular-weight particle, the space shrinks and transparency increases. When it is further heated to a level near the melting point (Tm) of the low-molecular-weight particle, a part of the low-molecular-weight particle is melted, filling the space with the low-molecular-weight particle due to volume expansion of the molten low-molecular-weight particle and thus the space disappears, resulting in transparent state (B). When it is cooled from hereon, the low-molecular-weight particle is crystallized right below the melting point, no airspace appears, and clear state (D) is maintained even at room temperature.

When the particles are heated to a level greater than the melting point of the low-molecular-weight particle, it causes difference in refractive index between the molten low-molecular-weight particle and the surrounding high-molecular-weight particle, resulting in half transparent state (C). When the particles are then cooled to room temperature, the low-molecular-weight particle undergoes crystallization at a temperature below the softening point of the high-molecular-weight particle due to the excessive cooling phenomenon. Because the high-molecular-weight particle is in a glass state at this point and it cannot follow the volume reduction of the low-molecular-weight particle by crystallization, and therefore, an airspace appears, and the particles return to original clouded state (A).

In the latter case wherein color tone is changed in a reversible manner depending on the temperature, the low-molecular-weight organic substance before melted corresponds to a leuco dye and a reversible developer (hereinafter may be referred to as "developer"), and the low-molecular-weight organic substance after melted but not crystallized corresponds to the leuco dye and the developer, and color tone is changed in a reversible manner between clear state and color developing state by heating.

Figure 9A:
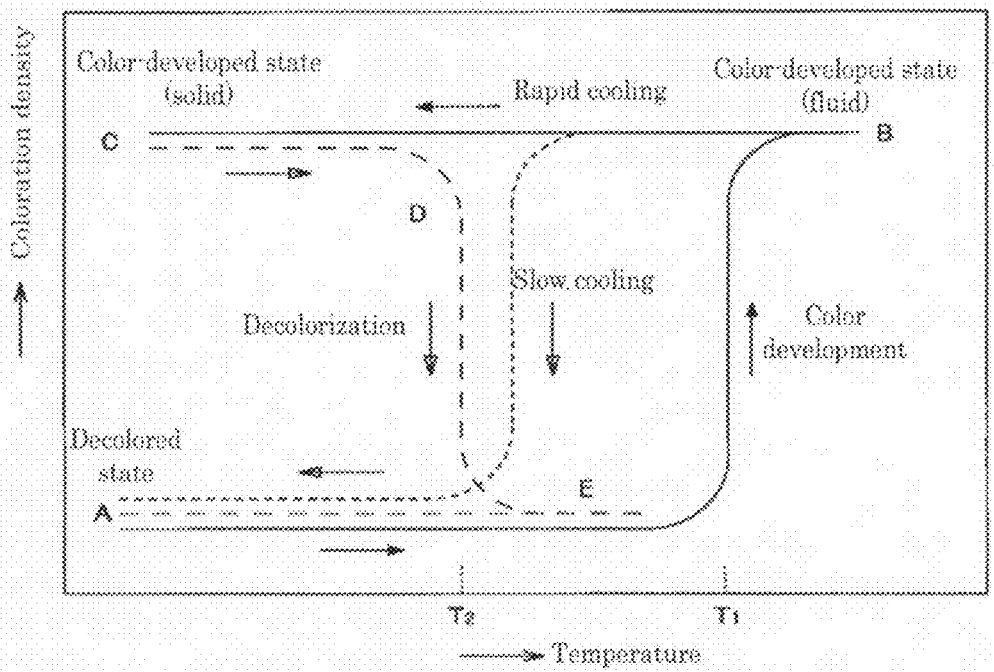
FIG. 9A is a graph showing color development-decolorization characteristics of a thermoreversible recording medium.
Figure 9B:
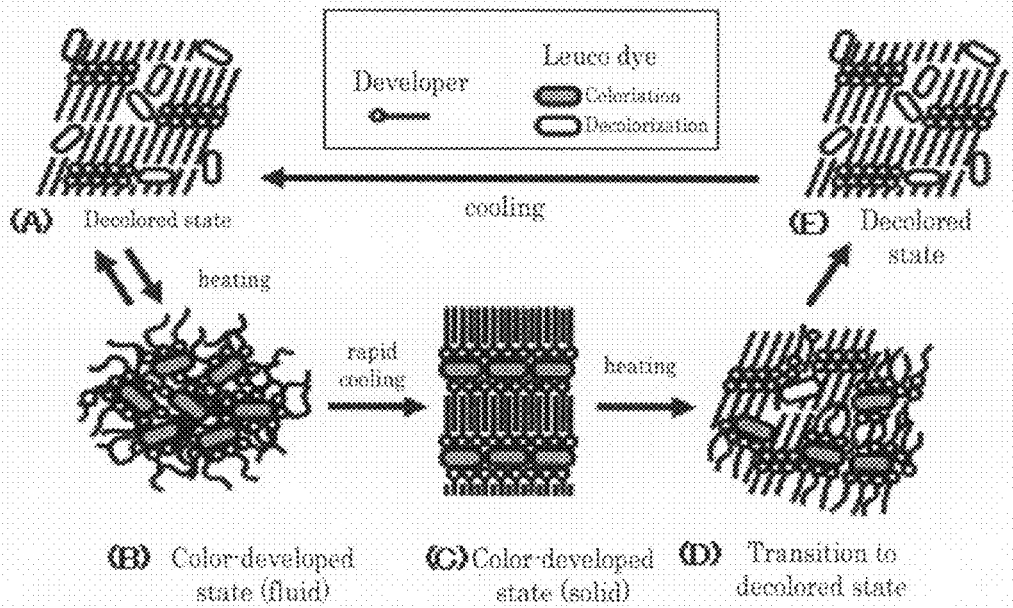
FIG. 9B is a schematic explanatory diagram showing the mechanism by which a thermoreversible recording medium changes between color-developed state and decolored state.
Figure 14:
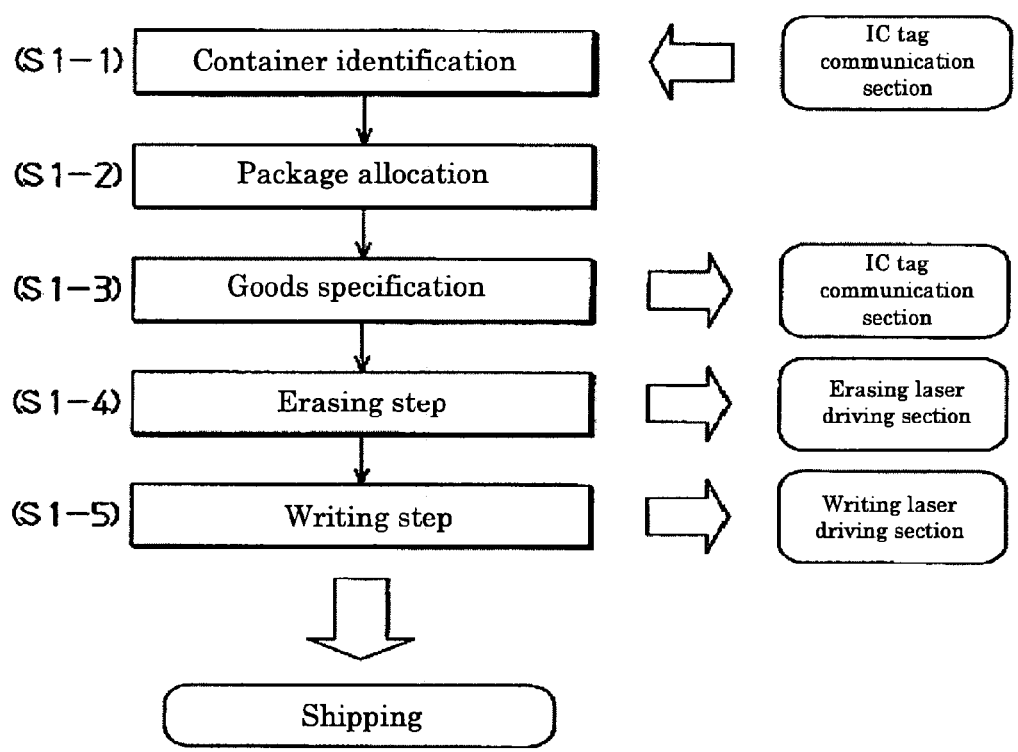
FIG. 14 is as schematic diagram showing an example of a process procedure in the delivery support system.

FIG. 9A shows an example of the temperature-color developing density conversion curve of the thermoreversible recording medium having a reversible thermosensitive recording layer made of resin in which the leuco dye and the developer are contained therein. FIG. 14B shows the mechanism by which the thermoreversible recording medium becomes transparent or colored in a reversible manner on heating.

First, the recording layer which is in a decolorized state (A) is heated, the leuco dye and the developer are melted and mixed together at a melting temperature $T_1$ and color is developed and the recording layer is in a molten color-developed state (B). When the layer is cooled rapidly, it can be cooled to room temperature while being in a molten color developing state (B) and the molten color-develop state (B) is stabilized, resulting in a stable color developed state (C). Whether or not it succeeds in obtaining this color developing state depends on the cooling rate from the molten state; when the layer is cooled gradually, discoloring occurs in the course of cooling and it returns to its original decolorized state (A) or a state of relatively lower density than the color developing state (C) by rapid cooling. Meanwhile, when the recording layer is again heated from the color developed state (C), discoloring occurs at temperature $T_2$, a temperature lower than the color developing temperature (from D to E), and when it is cooled, the recording layer returns to its original state, a decolorized state (A).

The color developing state (C), obtained by rapid cooling of the molten recording layer, is a state in which the leuco dye and the developer are mixed together in such a way that molecules may come in contact with each other for reaction; it is often that case that color developing state (C) is in a solid state. In this state a molten mixture (the color developed mixture) of the leuco dye and the developer is crystallized for development of color, and the color development is considered to be stabilized with this configuration. On the other hand, in the decolorized state the leuco dye and the developer are in phase separation state. In this state, molecules of at least one of the leuco dye and developer are clustered to form a domain or are crystallized; therefore, the leuco dye and the developer are considered to be separated from each other in a stabilized state by agglomeration or crystallization. In many cases, more complete discoloring occurs due to the phase separation of the leuco dye and the developer and crystallization of the developer.

Note in FIG. 9A that both discoloring achieved by gradual cooling from a molten state and discoloring achieved by heating from a color-developed state involve changes in the structure of aggregated molecules at temperature $T_2$, thereby causing phase separation and/or crystallization of the developer.

(Thermoreversible Recording Medium)

The thermoreversible recording medium used in the image processing method of the present invention includes at least a support and a reversible thermosensitive recording layer, and where necessary, further includes additional layers such as a protective layer, an intermediate layer, an undercoat layer, a back layer, a photothermal conversion layer, an adhesion layer, a sticking layer, a coloring layer, an air layer, and an optical reflective layer suitably selected. Each of these layers may be of a single layer structure or a multilayer structure.

Support

The shape, structure and size, etc. of the support are not particularly limited and may be selected according to the intended purpose. For example, the shape of the support is of flat plate, the structure thereof may be a single layer structure or multilayer structure, and the size thereof may be selected according to the size, etc. of the thermoreversible recording medium.

Examples of materials of the support include inorganic materials and organic materials.

Examples of the inorganic materials include glass, quartz, silicon, silicon oxides, aluminum oxides, $SiO_2$ and metals.

Examples of the organic materials include paper, cellulose derivatives such as cellulose triacetate, synthetic paper, films such as polyethylene terephthalate, polycarbonate, polystyrene, polymethylmethacrylate.

These inorganic materials and organic materials may be used alone or in combination. Of these, organic materials and films such as polyethylene terephtahlate, polycarbonate, polymethylmethacrylate, and the like are preferable and polyethylene terephthalate is particularly preferable.

It is preferable to modify the support surface by performing corona discharge, oxidation reaction (chromic acid), etching, easy-to-bond process, antistatic treatment or the like in order to improve adhesion of a coating layer.

It is also preferable for the support to be white-colored by adding a white pigment such as titanium oxide, etc.

The thickness of the support is not particularly limited and may be set accordingly and it is preferably 10 μm to 2,000 μm and more preferably 50 μm to 1,000 μm.

Reversible Thermosensitive Recording Layer

The reversible thermosensitive recording layer (hereinafter may be referred to as "recording layer") contains at least a material that offers temperature-dependent reversible changes in transparency or color tone, and further contains other ingredients where necessary.

The material that offers temperature-dependent reversible changes in transparency or color tone is a material capable of exhibiting a phenomenon in which temperature-dependent observable changes occur reversibly and of changing to a color-developed state or a decolorized state in a relative manner according to the difference in heating temperatures and the difference in cooling rate after heating. The observable changes can be divided into two types: changes in color, and change in shape. The former change is due for example to the change in transmittance, reflectivity, absorption wavelength, degree of scattering, and the like. In practical, the thermoreversible recording medium offers various color changes based on the different combinations of these factors.

The material that offers temperature-dependent reversible changes in transparency or color tone is not particularly limited and may be selected from those known in the art; examples include a mixed material of two or more polymers which change between clear state and clouded state based on the degree of compatibility between the polymers (see JP-A No. 61-258853), materials using phase changes of liquid crystal polymers (see JP-A No. 62-66990), and materials which are in a first color state at a first predetermined temperature that is higher than room temperature and are in a second color state when heated to a second predetermined temperature that is higher than the first predetermined temperature and cooled.

Of these, materials that offer color changes between the first and second predetermined temperatures are particularly preferable because temperatures can be easily controlled and high contrast is obtainable.

Examples include materials which are in a first color state at a first predetermined temperature that is higher than room temperature and are in a second color state when heated to a second predetermined temperature that is higher than the first predetermined temperature and then cooled, and materials which are further heated to a third predetermined temperature or higher, which the temperature is higher than the second predetermined temperature.

Examples of such materials include materials which become transparent at a first predetermined temperature and become clouded at a second predetermined temperature (see JP-A No. 55-154198), materials which develop color at a second predetermined temperature and decolorize at a first predetermined temperature (see JP-A Nos. 04-224996, 04-247985 and 4-267190), materials which become clouded at a first predetermined temperature and become transparent at a second predetermined temperature (see JP-A No. 03-169590), and materials which develop colors such as black, red and blue, etc. at a first predetermined temperature and decolorize at a second predetermined temperature (see JP-A Nos. 02-188293 and 02-188294).

A thermoreversible recording medium containing resin base material and a low-molecular-weight organic substance (e.g., a higher fatty acid) dispersed in the resin base material is advantageous in that the first and second predetermined temperatures are relatively low and thus a low-energy image formation or erasing is possible. Moreover, because the color developing and erasing mechanism is a physical change which relies on the solidification of resin and crystallization of low-molecular-weight organic substance, the medium offers a strong resistance to the environment.

Furthermore, because a thermoreversible recording medium containing a leuco dye and reversible developer (both will be described later), which develops color at a second predetermined temperature and decolorizes at a first predetermined temperature, exhibits a transparent state and color-developed state in a reversible manner, and when it is in the color-developed state, it exhibits black, blue and other colors; therefore, it is possible to obtain high-contrast images.

The low-molecular-weight organic substance (a substance which is dispersed in a resin base material and becomes transparent at a first predetermined temperature and becomes clouded at a second predetermined temperature) in the thermoreversible recording medium is not particularly limited as long as it is a substance whose structure changes from a polycrystalline structure to a single crystalline structure on heating in the recording layer, and can be selected accordingly. In general, substances with melting points ranging from about 30° C. to about 200° C. are usable and those with melting points of 50° C. to 150° C. are preferable.

Such low-molecular-weight organic substances are not particularly limited and may be selected accordingly and examples include alkanols; alkanediols; halogen alkanols or halogen alkane diols; alkylamines; alkanes; alkenes; alkines; halogenalkanes; halogenalkenes; halogenalkines; cycloalkanes; cycloalkenes; cycloalkines; saturated or unsaturated, mono or dicarboxylic acids and esters, amides or ammonium salts thereof, saturated or unsaturated halogen fatty acids and esters, amides or ammonium salts thereof, aryl carboxylic acids and esters, amides or ammonium salts thereof, halogen allyl carboxylic acids and esters, amides or ammonium salts thereof, thioalcohols; thiocarboxylic acids and esters, amines or ammonium salts thereof, and carboxylic acid esters of thioalcohols. These may be used alone or in combination.

The number of carbon atoms in each of these chemical species is preferably 10 to 60, more preferably 10 to 38 and most preferably 10 to 30. The alcohol groups in the esters may be saturated or unsaturated and may be substituted with halogens.

For example, the low-molecular-weight organic substance preferably contains in its molecule at least one species or moiety selected from oxygen, nitrogen, sulfur and halogen, such as —OH, —COOH, —CONH—, —COOR, —NH—, —NH$_2$, —S—, —S—S—, —O—, and halogen atoms.

More specifically, examples of these compounds include higher fatty acids such as lauric acid, dodecanoic acid, myristic acid, pentadecanoic acid, palmitic acid, stearic acid, behenic acid, nonadecane, arginic acid and oleic acid; and esters of higher fatty acids such as methyl stearate, tetradecyl stearate, octadecyl sterate, octadecyl laurate, tetradecyl palmitate, and dodecyl behenate. Of these, higher fatty acids are preferable; higher fatty acids having 16 or more carbon atoms, such as palmitic acid, stearic acid, behenic acid, and lignoceric acid are more preferable; and higher fatty acids having 16 to 24 carbon atoms are most preferable for the low-molecular-weight organic substances used in the third aspect of the image processing method.

In order to widen the temperature range within which the thermoreversible recording medium can be made transparent, the above-mentioned low-molecular-weight organic substances may be used in combination accordingly or the mentioned low-molecular-weight organic substance(s) may be combined with other material(s) having different melting points than those of the low-molecular-weight organic substances These combinations are disclosed in JP-A Nos. 63-39378, 63-130380 and JP-B No. 2615200, but are not specifically limited to thereto.

The resin base material forms a layer in which particles of the low-molecular-weight organic substance are uniformly dispersed and retained, and provides an effect on its transparency at maximum transparency. For this reason, the resin base material is preferably a resin having high transparency, mechanical stability and appropriate film-forming performance.

Such resins are not particularly limited and may be selected accordingly and examples include polyvinyl chlorides; vinyl chloride copolymers such as vinyl chloride-vinyl acetate copolymer, vinyl chloride-vinyl acetate-vinyl alcohol copolymer, vinyl chloride-vinyl acetate-maleic acid copolymer, vinyl chloride-acrylate copolymer, and polyvinylidene chloride; vinylidene chloride copolymers such as vinylidene chloride-vinyl chloride copolymer and vinylidene chloride-acrylonitrile copolymer; polyesters; polyamides; polyacrylates, polymethacrylates, or acrylate-methacrylate copolymers; silicone resins; and the like. These may be used alone or in combination.

The ratio of the low-molecular-weight organic substance to the resin (resin base material) in the recording layer is preferably 2:1 to 1:16 and more preferably 1:2 to 1:8 on a mass basis.

When the ratio of the low-molecular-weight organic substance to the resin is less than 2:1, it may be difficult to form a film which retains the low-molecular-weight organic substance in the resin base material, and when it is greater than 1:16, it may be difficult to make the recording layer opaque due to the small amount of the low-molecular-weight organic substance.

Additional ingredients such as a high-boiling point solvent, a surfactant, etc., may be added to the recording layer in addition to the low-molecular-weight organic substance and resin, in order to facilitate formation of a transparent image.

The high-boiling point solvent is not particularly limited and may be selected accordingly and examples include tributyl phosphate, tri-2-ethylhexyl phosphate, triphenyl phosphate, tricresyl phosphate, butyl oleic acid, dimethyl phthalate, diethyl phthalate, dibutyl phthalate, diheptyl phthalate, di-n-octyl phthalate, di-2-ethylhexyl phthalate, diisononyl phthalate, dioctyldecyl phthalate, diisodecyl phthalate, butylbenzyl phthalate, dibutyl adipate, di-n-hexyl adipate, di-2-ethylhexyl adipate, di-2-ethylhexyl azelate, dibutyl sebacate, di-2-ethylhexyl sebacate, diethylene glycol dibenzoate, triethylene glycol di-2-ethylbutyrate, methyl acetyl ricinolate, butyl acetyl ricinolate, butylphthalyl butylglycolate, and tributyl acetyl citrate.

The surfactants and additional ingredients are not particularly limited and may be selected accordingly and examples include polyalcohol higher fatty acid esters; polyalcohol higher alkyl ethers; lower olefin oxide adducts of polyalcohol higher fatty acid esters, higher alcohols, higher alkylphenols, higher fatty acid higher alkylamines, higher fatty acid amides, oils and fats, and polypropylene glycol; acetylene glycol; Na, Ca, Ba or Mg salts of higher alkylbenzene sulfonates; Ca, Ba or Mg salts of higher fatty acids, aromatic carboxylic acids, higher fatty acid sulfonates, aromatic sulfonates, mono esters of sulfuric acid or mono or di-ester phosphates; low-degree sulfate oils; poly long-chain alkyl acrylates; acrylic oligomers; poly long-chain alkyl methacrylates; monomer copolymers containing long-chain alkyl methacrylate-amine; styrene-maleic anhydride copolymers; and olefin-maleic anhydride copolymers.

The method for preparing the recording layer is not particularly limited and may be selected accordingly. For example, the recording layer may be prepared by applying and drying a solution into which two ingredients, the resin base material and low-molecular-weight organic substance are dissolved, or a dispersion solution, which is the solution (a solvent in which at least one type selected from the organic low-molecular material is insoluble) of the resin base material in which the low-molecular-weight organic substance is dispersed in the form of particles, on a support, for example.

The solvent used for the preparation of the recording layer is not particularly limited and may be selected according to the type of the resin base material and the low-molecular-weight organic substance: examples include tetrahydrofran, methyl ethyl ketone, methyl isobutyl ketone, chloroform, carbon tetrachloride, ethanol, toluene, and benzene. Meanwhile, the low-molecular-weight organic substance precipitates as particles and exists as being dispersed in the obtained recording layer in the case where dispersion solution was used, as well as in the case where the solution was used.

The low-molecular-weight organic substance in the thermoreversible recording medium may be composed of the leuco dye and the reversible developer and may develop color at a second predetermined temperature and decolorize at a first predetermined temperature.

The leuco dye itself is a colorless or light-colored dye precursor. The leuco dye is not particularly limited and may be selected from known leuco dyes and preferred examples include leuco compounds such as triphenylmethane phthalide, triarylmethane, fluoran, phenothiazine, thioferuolan, xanthene, indophthalyl, spiropyran, azaphthalide, chromenopyrazole, methine, rhodamineanilinolactam, rhodaminelactam, quinazoline, diazaxanthene and bislactone. Of these, fluoran- or phthalide-based leuco dyes are particularly preferable for excellent color development decolorization performance, color, storage stability, etc. These may be used alone or in combination. By stacking layers that offer different color tones, it is possible to obtain thermoreversible recording media that can provide multicolor and full colors.

The reversible developer is not particularly limited as long as it can develop or erase colors reversibly by heat and may be selected accordingly. Preferred examples include a compound having one or more structures selected from (1) a structure having a function to develop colors of the leuco dye (phenolic hydroxyl group, carboxylic group and phosphoric group, for example) and (2) a structure in which cohesive force between molecules is controlled (a structure to which long-chain hydrocarbon group is linked) within the molecule. Meanwhile, the linked site may have a hetero atom-containing linking group of two or more valencies, and at least any one of similar linking groups and aromatic groups may be contained in the long-chain hydrocarbon group.

Phenols are particularly preferable as (1) the structure having a function to develop colors of the leuco dye.

Long-chain hydrocarbon groups having 8 or more carbon atoms are preferable as (2) the structure in which bonding force between molecules is controlled, wherein the number of carbon atoms is more preferably 11 or more and the upper limit of the number of carbon atoms is preferably 40 or less and more preferably 30 or less.

Among the reversible developers described above, phenol compounds represented by the following General Formula (1) are preferable, and phenol compounds represented by the following General Formula (2) are more preferable.

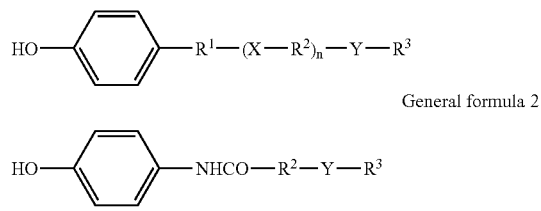

where "$R^1$" represents a single bond or an aliphatic hydrocarbon group having 1 to 24 carbon atoms; "$R^2$" represents an aliphatic hydrocarbon group which may be substituted and have 2 or more carbon atoms wherein the number of carbon atoms is preferably 5 or more, more preferably 10 or more; "$R^3$" represents an aliphatic hydrocarbon group having 1 to 35 carbon atoms wherein the number of carbon atoms is preferably 6 to 35, more preferably 8 to 35; and these aliphatic hydrocarbon groups may be identical or different.

The sum of the number of carbon atoms of "$R^1$", "$R^2$" and "$R^3$" is not particularly limited and may be set accordingly and the lower limit is preferably 8 or less, more preferably 11 or less, and the upper limit is preferably 40 or less, more preferably 35 or less.

When the sum of the number of carbon atoms is less than 8, color developing stability and decolorization capability may be reduced.

The aliphatic hydrocarbon groups may be of straight chain or branched chain and may contain a unsaturated bond; however they are preferably of straight chain. Furthermore, examples of substituents that bond to the hydrocarbon groups include hydroxyl group, halogen atoms, alkoxy group, etc.

"X" and "Y" may be identical or different and each represents a bivalent group containing nitrogen atom or oxygen atom; specific examples include oxygen atom, amide group, urea group, diacylhydrazine group, oxalic diamide, and acylurea group. Among them, amide group and urea group are preferable.

"n" represents an integer of 0 to 1.

It is preferable for the developer (electron-receptive compound) to be used in combination with a compound having at least one of —NHCO-group and —OCONH-group in its molecule as a decolorization accelerator. This is preferable because intermolecular interactions are induced between the decolorization accelerator and the reversible developer during the course of creating a decolorized state, to thereby improve color development and decolorization.

The decolorization accelerator is not particularly limited and may be selected according to the intended purpose, and preferred examples include compounds represented by the following General Formulas (3) to (9).

$$R^1\text{—NHCO—}R^2 \quad \text{General Formula 3}$$
$$R^1\text{—NHCO—}R^3\text{—CONH—}R^2 \quad \text{General Formula 4}$$
$$R^1\text{—CONH—}R^3\text{—NHCO—}R^2 \quad \text{General Formula 5}$$
$$R^1\text{—NHCOO—}R^2 \quad \text{General Formula 6}$$
$$R^1\text{—NHCOO—}R^3\text{—OCONH—}R^2 \quad \text{General Formula 7}$$
$$R^1\text{—OCONH—}R^3\text{—NHCOO—}R^2 \quad \text{General Formula 8}$$
$$R^1\text{—NHCOO—}R^5\text{—OCONH—}R^2 \quad \text{General Formula 9}$$
$$\qquad\qquad\;\;\; |$$
$$\qquad\qquad\; \text{OCONH—}R^4$$

where "$R^1$," "$R^2$" and "$R^4$" each represent a straight-chain alkyl group, branched alkyl group or unsaturated alkyl group, having 7 to 22 carbon atoms; "$R^3$" represents a methylene group having 1 to 10 carbon atoms; and "$R^5$" represents a trivalent functional group having 4 to 10 carbon atoms.

The ratio at which the color development agent (electron-donative color-development compound) and developer (electron-acceptive compound) are mixed cannot be determined flatly because a suitable ratio varies depending on the combinations of compounds used, however, the reversible developer preferably contains the color development agent and developer in proportions of 1:0.1-20, more preferably 1:0.2-10 on a mole basis. If the proportion of the developer falls outside this preferred range, it results in poor color development density.

When the decolorization accelerator is added, it is preferably added in an amount of 0.1 parts by mass to 300 parts by mass per 100 parts by mass of developer, and more preferably 3 parts by mass to 100 parts by mass. Note that the color development agent and the developer may be encapsulated in a microcapsule for use.

Binder resin and, where necessary, various additives may be added to the reversible recording layer for the purpose of improving or controlling coating properties or color development and decolorization properties; examples of such additives include surfactants, plasticizers, conductive agents, filling agents, antioxidants, light stabilizers, color stabilizers, and decolorization accelerators.

The binder resin is not particularly limited as long as it is capable of binding the recording layer to the support, and one or more known resins can be suitably used along or in combination. Resins that can be cured or hardened on heating or by irradiation with ultraviolet ray or electron ray are preferable in order to improve cycle durability. In particular, thermosetting resins using isocyanate compounds as cross-linking agents are preferable. Examples of the thermosetting resins include resins having groups such as hydroxyl group and/or carboxylic group which react with cross-linking agents, and resins obtained by copolymerization of monomers with hydrocarbon groups and/or carboxylic groups and other monomers. Specific examples of such thermosetting resins include phenoxy resins, polyvinyl butyral resins, cellulose acetate propionate resins, cellulose acetate butyrate resins, acrylpolyol resins, polyester polyol resins, and polyurethane polyol resins. Among them, acrylpolyol resins, polyester polyol resins and polyurethane polyol resins are particularly preferable.

The acrylpolyol resins can be prepared by known solution polymerization, suspension polymerization, emulsion polymerization, etc., of (metha)acrylic acid ester monomers and carboxylic group-containing unsaturated monomers, hydroxyl group-containing unsaturated monomers or other ethylenically unsaturated monomers.

Examples of the hydroxyl group-containing unsaturated monomers include hydroxylethylacrylate (HEA), hydroxylpropylacrylate (HPA), 2-hydroxyethylmethacrylate (HEMA), 2-hydroxypropylmethacrylate (HPMA), 2-hydroxybutylmonoacrylate (2-HBA), 1,4-hydroxybutylmonoacrylate (1-HBA), and the like. Of these, 2-hydroxyethylmethacrylate is preferable because it results in excellent crack resistance and excellent coat durability of coated film when a monomer having primary hydroxyl group is used.

In the recording layer the color development agent and the binder resin are preferably mixed together in proportions of 1:0.1-10 on a mole basis. If the proportion of binder resin is too small, it may result in insufficient thermal strength of the recording layer. If the proportion of binder resin is too larger, it may result in poor color development density.

The cross-linking agent is not particularly limited and may be selected accordingly, and examples include isocyanates, amino resins, phenol resins, amines, epoxy compounds, and the like. Among them, isocyanates are preferable and polyisocyanate compounds having multiple isocyanate groups are particularly preferable.

Examples of isocyanates include hexamethylene diisocyanate (HDI); tolylene diisocyanate (TDI); xylylene diisocyanate (XDI); adducts, burettes and isocyanurates thereof by trimethylolpropane; and blocked isocyanates.

The cross-linking agent is preferably added to the binder resin in such an amount that the ratio of the number of functional groups in the cross-linking agent to the number of active groups in the binder resin is 0.01 to 2.

If the amount of the cross-linking agent added to the binder resin is too small enough to satisfy this range, it results in poor heat strength, and if the amount is too large to satisfy this range, it may result in adverse effects on color development and decolorization properties.

Furthermore, any catalyst that is used in this type of reaction may be used as a cross-linking accelerator. Examples of the cross-linking accelerator include third amines such as 1,4-diazabicyclo [2,2,2] octane and metal compounds such as organic tin compound.

Gel fraction of the thermosetting resin after cured by heat is preferably 30% or more, more preferably 50% or more and most preferably 70% or more. A gel fraction of less than 30% may result in poor cross-linking condition, which leads to poor durability.

Whether the binder resin has been cured (cross-linked state) or not (non-cross-linked state) can be determined by dipping the coated film in a solvent of high solubility. More specifically, the binder resin in a non-crosslinked state begins to dissolve in the solvent, and will not be left in the solute.

The additional ingredients that may be contained in the recording layer are not particularly limited and may be selected accordingly; examples include surfactants and plasticizers for facilitating image formation.

The surfactants are not particularly limited and may be selected accordingly, and examples include anion surfactants, cationic surfactants, non-ion surfactants, and ampholytic surfactants.

The plasticizers are not particularly limited and may be selected accordingly and examples include phosphates, fatty acid esters, phthalates, diacid esters, glycol, polyester plasticizers, and epoxy plasticizers.

For solvents for preparing the recording layer, dispersing devices for coating solution, methods of coating, drying, hardening, etc., the recording layer, known solvents and methods that can be used in the back layer can be used.

Note that the coating solution for recording layer may be prepared by dissolving corresponding ingredients in a solvent using the dispersing device, or may be prepared by dissolving each ingredient in a suitable solvent to prepare coating solutions for the ingredients and combining them together. In addition, the ingredients dissolved in the coating solution by heating may be precipitated by rapid or gradual cooling.

The method for preparing the recording layer is not particularly limited and may be selected accordingly. Preferred examples include (1) a method in which the support is coated with a coating solution for recording layer, the solution obtained by dissolving the solution the binder resin, the electron-donative color-development compound and the electron-acceptive compound are dissolved and/or dispersed in a solvent, and the mixture is then cross-linked at the time when it is made into a sheet-like shape by evaporation of the solvent or after that, (2) a method in which the support is coated with a coating solution for recording layer, the solution obtained by dissolving only binder resin is dissolved in a solvent and dispersing the electron-donative color-development compound and the electron-acceptive compound in the solvent, and the mixture is then cross-linked at the time when it is made into a sheet-like shape by evaporation of the solvent or after that, and (3) a method in which the binder resin, electron-donative color-development compound and electron-acceptive compound are heated and mixed together without using any solvent and the mixture is cross-linked after being formed into a sheet-like shape and cooled. Note also in these methods that a sheet-shaped thermoreversible recording medium can be provided without using any support.

Solvents used in the methods (1) and (2) are not particularly limited and may be selected accordingly. Although it cannot be selected flatly because a suitable solvent differs depending on the type of binder resin, the electron-donative color-development compound and the electron-acceptive compound; however, examples include tetrahydrofuran, methyl ethyl ketone, methyl isobutyl ketone, chloroform, carbon tetrachloride, ethanol, toluene, and benzene.

The electron-acceptive compound exists in the recording layer in the form of dispersed particles.

In order for the coating solution for the recording layer to exhibit high performance as a coating solution for coating material, various pigments, antifoaming agent, dispersing agent, slipping agent, antiseptic agent, cross-linking agent, plasticizer, etc. may be added to the coating solution for the recording layer.

The method for forming the recording layer is not particularly limited and may be selected accordingly. The recording layer can be prepared by transporting the support in the form of a continuous roll or a cut sheet and applying thereon the coating solution for recording layer by known method, such as blade coating, wire bar coating, spray coating, air knife coating, bead coating, curtain coating, gravure coating, kiss coating, reverse roll coating, dip coating, dye coating, or the like.

The drying condition of the coating solution for recording layer is not particularly limited and may be selected accordingly; for example, the coating solution is dried at room temperature to 140° C. for about 10 seconds to 10 minutes.

The thickness of the recording layer is not particularly limited and may be adjusted accordingly; for example, it is preferably 1 µm to 20 µm and more preferably 3 µm to 15 µm. When the thickness of the recording layer is less than 1 µm, image contrast may be lowered due to decrease in color developing density, and when the thickness is greater than 20 µm, heat expands greatly in the layer and thus areas where temperature does not reach the color development temperature and no color is developed appear and a desired color development density may not be obtained.

Where necessary, the thermoreversible recording medium of the present invention may include, in addition to the recording layer, additional layer(s) appropriately selected, such as a protective layer, an intermediate layer, a undercoat layer, a back layer, a photothermal conversion layer, an adhesion layer, a sticking layer, a coloring layer, an air layer, and/or an optical reflective layer. Each of these layers may be of a single layer structure or a multilayer structure.

Protective Layer

It is preferable to provide a protective on the recording layer for the purpose of protecting the recording layer. The protective layer is not particularly limited and may be selected accordingly, and it may be formed into a multilayer; however, it is preferably disposed on an exposed outermost surface.

The protective layer contains at least a binder resin and further contains other ingredient(s) such as a filler, a lubricant and/or a coloring pigment as needed.

The resin used for the protective layer is not particularly limited and may be selected accordingly and preferred examples include UV-curable resins, thermosetting resins, and electron beam-curable resins. Of these, UV-curable resins and thermosetting resins are particularly preferable.

Since UV-curable resins can form very hard films after being cured and can prevent surface damages due to physical contact and/or deformation of media by laser heating, it is possible to provide a thermoreversible recording medium with excellent cycle durability.

Similarly thermosetting resins can harden a surface, though their hardening capability is slightly lower than that of UV-curable resins, and can provide a thermoreversible recording medium of excellent cycle durability.

The UV-curable resins are not particularly limited and may be selected from known UV-curable resins accordingly. Examples include oligomers of urethane acrylates, epoxy acrylates, polyester acrylates, polyether acrylates, vinyls and unsaturated polyesters; and monomers of various monofunctional or polyfunctional acrylates, methacrylates, vinyl esters, ethylene derivatives, allyl compounds, and the like. Of these, polyfunctional monomers or oligomers of tetrafunctional or more are particularly preferable. By mixing two or more different these monomers or oligomers, hardness, degree of shrinkage, flexibility, strength, etc., of a resin film can be adjusted appropriately.

In order to cure the foregoing monomer or oligomer by irradiation with ultraviolet ray, it is necessary to use a photopolymerization initiator and a photopolymerization accelerator.

Photopolymerization initiators can be classified broadly into radical reaction type and ion reaction type, and the radical reaction type can be further classified into photo-cleavable type and hydrogen-abstraction type.

The photopolymerization initiator is not particularly limited and may be selected accordingly and examples include isobutylbenzoinether, isopropylbenzoinether, benzomethyletherbenzoinmethylether, 1-phenyl-1,2-propanedion-2-(o-ethoxycarbonyl)oxime, 2,2-dimethoxy-2-phenylacetophenonebenzyl, hydroxycyclohexylphenylketone, diethoxyacetophenone, 2-hydroxy-2-methyl-1-phenylpropane-1-on, benzophenone, chlorothioxanthone, 2-chlorothioxanthone, isopropylthioxanthone, 2-methylthioxanthone, and chlorine-substituted benzophenone. These may be used alone or in combination.

The photopolymerization accelerator is not particularly limited and may be selected accordingly. It is preferably the one having an effect of improving curing rate for the photopolymerization initiator of hydrogen abstraction type such as benzophenone, thioxanthone, etc. and examples include aromatic tertiary amines or aliphatic amines. Specific examples include isoamyl p-dimethylamino benzoate, and ethyl p-dimethylamino benzoate. These may be used alone or in combination.

The added amount of the photopolymerization initiator and photopolymerization accelerator is not particularly limited and may be adjusted accordingly, and it is preferably 0.1% by mass to 20% by mass and more preferably 1% by mass to 10% by mass relative to the total amount of the resin component in the protective layer.

Ultraviolet irradiation for curing the UV-curable resin can be performed using any of known ultraviolet irradiation devices and examples of thereof include ones equipped with a laser source, a lamp fitting, an electric source, a cooling device, a carrier device, etc.

Examples of the laser source include a mercury lamp, a metal halide lamp, a potassium lamp, a mercury xenon lamp, and a flash lamp. The wavelength of light emitted from the laser source is not particularly limited and may be suitably selected according to the UV absorption wavelengths of the photopolymerization initiator and photopolymerization accelerator contained in the composition for the thermoreversible recording medium.

The condition used for UV irradiation is not particularly limited and may be set accordingly; for example, the lamp output and light-propagation rate may be suitably determined according to the irradiation energy needed to cross-link the resin.

Moreover, for the purpose of improving transportability of the media, a releasing agent such as a polymerizable group-containing silicone, silicone-grafted polymer, wax, or zinc stearate, and/or a lubricant such as silicone oil may be added to the protective layer. The added amount of these agents is preferably 0.01% by mass to 50% by mass, more preferably 0.1% by mass to 40% by mass relative to the total amount of the resin component in the protective layer. These agents may be used singly or in combination. Moreover, in order to remove static electricity, it is preferable to add a filler, more preferably a needed-shaped conductive filler.

The particle diameter of the inorganic pigment preferably ranges from 0.01 µm to 10.0 µm, more preferably 0.05 µm to 8.0 µm. The inorganic pigment is preferably added in an amount of 0.001 parts to 2 parts, more preferably 0.005 parts to 1 part per 1 part of the resin.

Examples of the organic filler include silicone resins, cellulose resins, epoxy resins, nylon resins, phenol resins, polyurethane resins, urea resins, melamine resins, polyester resins, polycarbonate resins, styrene resins, acrylic resins, polyethylene resins, formaldehyde resins, and polymethyl methacrylate resins.

For the conductive filler, titanium oxide whose surface is covered with antimony-doped tin oxide is particularly preferable.

Additive(s) such as known surfactants, leveling agents, and/or antistatic agents may be added to the protective layer.

For the thermosetting resins, resins similar to the binder resins used in the recording layer can be used.

Furthermore, polymers having a UV-absorbing structure (hereinafter may be referred to as "UV-absorbing polymers") may be used.

As used herein the term "polymer having a UVt-absorbing structure" refers to a polymer having a UV-absorbing structure (e.g., UV-absorbable group) in the molecule.

Examples of the UV-absorbing structure include a salicylate structure, cyanoacrylate structure, benzotriazole structure, and benzophenone structure. Of these, the benzotriazole structure and benzophenone structure are particularly preferable in view of their excellent light resistance.

The polymers having the UV-absorbing structure are not particularly limited and may be selected accordingly, and examples include copolymers of 2-(2'-hydroxy-5'-methacryloxyethylphenyl)-2H-benzotriazole, 2-hydroxyethyl methacrylate and styrene, copolymers of 2-(2'-hydroxy-5'-methylphenyl)benzotriazole, 2-hydroxypropyl methacrylate and methylmethacrylate, copolymers of 2-(2'-hydroxy-3'-t-butyl-5'-methylphenyl)-5-chlorobenzotriazole, 2-hydroxyethyl methacrylate, methyl methacrylate and t-butyl methacrylate, and copolymers of 2,2,4,4-tetrahydroxybenzophenone, 2-hydroxypropyl methacrylate, styrene, methyl methacrylate and propyl methacrylate. These may be used alone or in combination.

It is preferable that the thermosetting resins be crosslinked; therefore, it is preferable to adopt thermosetting resins having a group that reacts with a curing agent, such as hydroxyl group, amino group, and carboxylic group, and polymers having hydroxyl groups are particularly preferable. The thermosetting resins preferably have a hydroxyl value of 10 or more, more preferably 30 or more and most preferably 40 or more for sufficient coated-film strength in order to increase the protective layer's strength. By imparting sufficient strength to the coated film, degradation of the thermoreversible recording medium can be suppressed even after cycles of image formation and erasing.

Preferred examples of the curing agents include the one similar to the curing agents used for the recording layer.

For solvents for preparing the protective layer, dispersing devices for coating solution for protective layer, methods of coating, drying, hardening, etc., the protective layer, known solvents and methods that can be used for the recording layer can be used. When a UV-curable resin is used, a curing step is necessary after application and drying of the coating solution for protective layer. However, the UV irradiation device, laser source, irradiation condition, etc. are as described above.

The thickness of the protective layer is not particularly limited and may be adjusted accordingly, and it is preferably 0.1 µm to 20 µm, more preferably 0.5 µm to 10 µm and most preferably 1.5 µm to 6 µm. When the thickness is less than 0.1 µm, the function as a protective layer of the thermoreversible recording medium cannot be fully exerted and the medium is vulnerable to degradation due to heat after a certain level of cycle, which unables the medium to be used repeatedly. When the thickness is greater than 20 µm, it results in failure to transmit sufficient heat to a recording layer, a layer placed below the protective layer, which may in turn make image printing or erasing by heat impossible.

Intermediate Layer

An intermediate layer is preferably disposed between the recording layer and the protective layer, for the purposes of improving adhesion properties between the recording layer and the protective layer, preventing degeneration of the recording layer owing to application of the protective layer thereon, and preventing the additives in the protective layer from transferring into the recording layer, etc., whereby storage stability a color-developed image can be improved.

The intermediate layer contains at least a binder resin and further contains additional ingredient(s) such as a filler, a lubricant and/or a coloring pigment where necessary.

The binder resin in the intermediate layer is not particularly limited and may be selected accordingly, and resins for the recording layer, thermoplastic resins and thermosetting resins can be used.

Examples of the binder resin include polyethylene, polypropylene, polystyrene, polyvinylalcohol, polyvinylbutyral, polyurethane, saturated polyesters, unsaturated polyesters, epoxy resins, phenol resins, polycarbonates, and polyamides.

It is preferable for the intermediate layer to contain a UV-absorbing agent. The UV-absorbing agent may be either an organic UV-absorbing agent or an inorganic UV-absorbing agent.

Examples of organic UV-absorbing agents include benzotriazole-based UV-absorbing agents, benzophenone-based UV-absorbing agents, salicylate ester-based UV-absorbing agents, cyanoacrylate-based UV-absorbing agents and cinnamate-based UV-absorbing agents. Of these, benzotriazole-based UV-absorbing agents are preferable.

Among benzotriazole-based UV-absorbing agents, those in which hydroxyl groups are protected by nearby bulky functional groups are particularly preferable, and preferred examples thereof include 2-(2'-hydroxy-3',5'-di-t-butylphenyl)benzotriazole, 2-(2'-hydroxy-3'-t-butyl-5'-methylphenyl)benzotriazole, 2-(2'-hydroxy-3',5'-di-t-butylphenyl)-5-chlorobenzotriazole and 2-(2'-hydroxy-3'-t-butyl-5'-methylphenyl)-5-chlorobenzotriazole. Furthermore, any of these UV-absorbing skeletons may be suspended from copolymerized polymers such as acrylic resins and styrene resins.

The content of the organic UV-absorbing agent is preferably 0.5% by mass to 10% by mass relative to the total amount of the resin component in the intermediate layer.

The inorganic UV-absorbing agents are preferably particles of metal compounds with an average particle diameter of 100 nm or less, and examples include metal oxides such as zinc oxide, indium oxide, alumina, silica, zirconia oxide, tin oxide, cerium oxide, iron oxide, antimony oxide, barium oxide, calcium oxide, bismuth oxide, nickel oxide, magnesium oxide, chrome oxide, manganese oxide, tantalum oxide, niobium oxide, thorium oxide, hafnium oxide, molybdenum oxide, ferrous ferrite, nickel ferrite, cobalt ferrite, barium titanate and potassium titanate or complex oxides thereof; metal sulfides such as zinc sulfide and barium sulfide or sulfated compounds thereof; metal carbides such as titanium carbide, silicon carbide, molybdenum carbide, tungsten carbide and tantalum carbide; metal nitrides such as aluminum nitride, silicon nitride, boron nitride, zirconium nitride, vanadium nitride, titanium nitride, niobium nitride and gallium nitride. Of these, ultrafine particles of metal oxides are preferable, and silica, alumina, zinc oxide, titanium oxide and cerium oxide are more preferable. Meanwhile, surfaces of these metal compounds may be treated with silicone, wax, organic silane or silica.

The content of the inorganic ultraviolet absorbing agent is preferably 1% to 95% in volume fraction.

The content of the inorganic UV-absorbing agent is preferably 1% by volume to 95% by volume. The organic and inorganic UV-absorbing agents may be contained in the recording layer rather than the intermediate layer.

Moreover, UV-absorbing polymers may be used, and may be cured by cross-linking agents. The UV-absorbing polymers used in the protective layer can be adopted.

The thickness of the intermediate layer is not particularly limited and may be adjusted accordingly and it is preferably 0.1 µm to 20 µm and more preferably 0.5 µm to 5 µm. For solvents for preparing the intermediate layer, dispersing devices for coating solution for intermediate layer, methods of coating, drying, hardening, etc., the intermediate layer, known solvents and methods that can be used for the protective layer can be used.

An under layer may be disposed between the recording layer and the support for the purposes of achieving high sensitivity by efficiently utilizing heated applied, improving adhesion properties between the support and the recording layer, and preventing infiltration of the recording layer material into the support. The under layer contains at least hollow particles, and contains a binder resin and, where necessary, contains additional ingredient(s).

Examples of the hollow particles include single-hollow particles each having one void therein, and multiple-hollow particles each having a plurality of voids therein. These hollow particles may be used alone or in combination.

Materials of the hollow particles are not particularly limited and may be selected accordingly, and preferred examples include thermoplastic resins.

The hollow particles may be prepared as needed or may be purchased ready-made. Examples of commercial products include Microsphere R-300 (by Matsumoto Yushi-Seiyaku Co., Ltd.), Lopake HP1055 and Lopake HP433J (by Zeon Corp) and SX866 (by JSR Corp).

The added amount of the hollow particles in the under layer is not particularly limited and may be adjusted accordingly and it is preferably 10% by mass to 80% by mass, for example.

For the binder resin for hollow particles, binder resins similar to those used for the preparation of the recording layer or the layer containing a polymer having a UV-absorbing structure may be used.

At least one of an inorganic filler (e.g., calcium carbonate, magnesium carbonate, titanium oxide, silicon oxide, aluminum hydroxide, kaolin, and talc) and an organic filler of various types may be contained in the under layer.

Additional additive(s) such as a lubricant, a surfactant, and/or a dispersing agent may be contained in the under layer.

The thickness of the under layer is not particularly limited and may be adjusted accordingly, and it is preferably 0.1 µm to 50 µm, more preferably 2 µm to 30 µm and most preferably 12 µm to 24 µm.

Back Layer

In the present invention, a back layer may be disposed on a side of the support which is opposite of the side on which the recording layer is disposed, to prevent curl or electrical charging of the thermoreversible recording medium and to improve transportability. The back layer contains at least a binder resin and, where necessary, further contains additional ingredient(s) such as a filler, a conductive filler, a lubricant and/or a coloring pigment.

The binder resin for the back layer is not particularly limited and may be selected accordingly, and examples include thermosetting resins, UV-curable resins, and electron beam-curable resins. Of these, UV-curable resins and thermosetting resins are particularly preferable.

UV-curable resins, thermosetting resins, fillers, conductive fillers, and lubricants that are similar to those used for the recording layer, protective layer and the intermediate layer can suitably be used for the preparation of the back layer.

Adhesion Layer and Sticking Layer

It is possible to provide a thermoreversible recording label by disposing an adhesion layer or sticking layer on a side of the support where the recording layer is not formed. General materials can be used to prepare the adhesion layer or sticking layer.

Specific examples of materials for the adhesion layer or sticking layer include, but not limited to, urea resins, melamine resins, phenol resins, epoxy resins, vinyl acetate resins, vinyl acetate-acrylic copolymers, ethylene-vinyl acetate copolymers, acrylic resins, polyvinylether resins, vinyl chloride-vinyl acetate copolymers, polystyrene resins, polyester resins, polyurethane resins, polyamide resins, chlorinated polyolefin resins, polyvinyl butyral resins, acrylic acid ester copolymers, methacrylic acid ester copolymers, natural rubbers, cyanoacrylate resins, and silicone resins.

The materials for the adhesive layer and the sticking layer may be of hot-melt type. Release paper may also be used or it may be of non-release paper type. By disposing the adhesive layer or the sticking layer as described above, the recording layer can be attached to a entire or part of the surface of a thick substrate like a vinyl chloride card with magnetic stripes, where it is difficult to form a recording layer thereon. This improves convenience of the thermoreversible recording medium, e.g., a part of magnetically stored information can be displayed.

The thermoreversible recording label to which such adhesive layer or sticking layer is disposed is suitable for thick cards such as IC cards, optical cards, and the like.

When a photothermal conversion layer containing at least a photothermal conversion material is disposed, the photothermal conversion material is normally used in combination with resin. The resins used for the photothermal conversion layer are not particularly limited and may be selected from known resins accordingly as long as they are capable of holding inorganic materials and organic materials; thermoplastic resins and thermosetting resins are preferable.

The photothermal conversion layer has a function to absorb a laser beam and generate heat. Main materials for the photothermal conversion layer can be classified broadly into inorganic materials and organic materials.

Examples of the inorganic materials include carbon blacks, metals such as Ge, Bi, In, Te, Se and Cr and semimetals or alloys thereof, and these are formed into a layer by vacuum evaporation, or bonding together particulate materials with resin or the like. Various dyes may suitably be used as the organic materials depending on the wavelength at which light is absorbed, and when a laser diode is used as a laser source, near-infrared absorbing dyes having an absorption peak at near 700 nm to 1,500 nm are used. Specific examples include thereof cyanine dyes, quinine dyes, quinoline derivatives of indonaphthol, phenylenediamine-based nickel complexes and phthalocyanine dyes. It is preferable to select a photothermal conversion material which offers excellent heat resistance because cycles of printing and erasing are repeated.

The near-infrared absorbing dyes may be contained in the recording layer singly or in combination. In this case, the recording layer also serves as a photothermal conversion layer.

A coloring layer may be disposed between the support and the recording layer of the thermoreversible recording medium for the purpose of improving visibility.

The coloring layer may be formed by applying on a target surface a solution or dispersion solution containing a coloring agent and binder resin followed by drying, or by simply attaching a colored sheet to the target surface.

It is also possible to provide the thermoreversible recording medium with a color printing layer. Examples of the coloring agent in the color printing layer are various types of dyes and pigments contained in color inks used for conventional full-color print.

Examples of the binder resin include various thermoplastic resins, thermosetting resins, UV-curable resins and electron beam-curable resins.

The thickness of the color printing layer is not particularly limited, and because it may vary appropriately depending on the print color density, the thickness may be selected according to the desired print color density.

The thermoreversible recording medium may have a non-reversible recording layer in combination. The developed color tone of each recording layer may be identical or different. Furthermore, coloring layers on which optional pictures are formed by printing such as offset printing and gravure printing or by inkjet printers, thermoelectric printers and dye sublimation printers on part or entire surface of the same side or part of the opposite side of the recording layer in the thermoreversible recording medium. Furthermore, an OP varnish layer, which contains a curable resin as a main component, may be disposed on part or entire surface of the coloring layer. Examples of pictures include characters, patterns, drawing patterns, photographs and information detectable by infrared rays. Moreover, any of the constituent layers may be colored by simply adding thereto dye or pigment.

Furthermore, holograms may be provided in the thermoreversible recording medium for security purposes. And designs such as figures, company symbols and symbol marks, etc. may be disposed by forming convexes and concaves in a relief form or intaglio form for provision of industrial design.

The thermoreversible recording medium can be formed into desired form accordingly and may be formed into card form, tag form, label form, sheet form and roll form, for example. The thermoreversible recording medium formed into card form can be applied to prepaid cards and point cards, etc. and can be further applied to credit cards.

In addition, the thermoreversible recording medium in tag form, which is smaller than card form, can be applied to price tags, etc. and the thermoreversible recording medium in tag form, which is larger than card form, may be applied to process management, shipping instruction and ticket, etc. The thermoreversible recording medium in label form may be processed to have various sizes and used for process management or material management, etc. by sticking to trucks, containers, boxes and bulk containers, etc. which are used repeatedly. Moreover, because the thermoreversible recording medium of sheet size, which is larger than card size, allows wider print range, it is usable for general documents or instructions for process management.

Example of Combination of Thermoreversible Recording Medium With Thermoreversible Recording Member RF-ID A thermoreversible recording member used in the present invention includes the reversible thermosensitive recording layer (recording layer) and an information storage unit which are disposed (integrated) to the same card or tag. Information can be checked by just looking at the card or tag without using a special instrument, thus providing excellent convenience. When the content of the information storage unit has been overwritten, the item displayed on a thermoreversible recording portion is overwritten correspondingly. In this way the thermoreversible recording medium can be used repeatedly.

The information storage unit is not particularly limited and may be selected accordingly, and preferred examples include magnetic recording layers, magnetic stripes, IC memories, optical memories, and RF-ID tags. When the information storage unit is used for process management and material management, a RF-ID tag is particularly suitable for use. Incidentally, the RF-ID tag is composed of a IC chip and an antenna connected to the IC chip.

The thermoreversible recording member has the reversibly displayable recording layer and information storage unit, and a preferred example of the information storage unit is a RF-ID tag.

Figure 10:
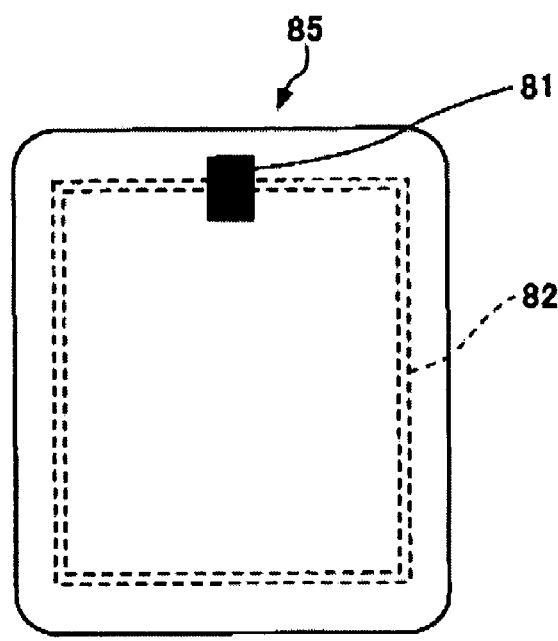
FIG. 10 is a schematic diagram showing an example of a RF-ID tag.

FIG. 10 shows a schematic diagram of a RF-ID tag 85. The RF-ID tag 85 is composed of an IC chip 81 and an antenna 82 connected to the IC chip 81. The IC chip 81 is divided into 4 sections: a storage unit, a power adjusting unit, a transmission unit, and a receiving unit, each of which bears a part of operation for communication. The antennas of RF-ID tag 85 and reader/writer exchange data by radiowave. Specifically, there are two types of communication: an electromagnetic guidance system in which the antenna of RF-ID 85 receives a radiowave from the reader/writer whereby an electromotive force is generated by electromagnetic guidance through resonant effect; and a radiowave system which is activated by radiated electromagnetic field. In either system, the IC chip 81 in the RF-ID tag 85 is activated by electromagnetic field from outside, information in the chip is converted into a signal which is then transmitted from the RF-ID tag 85. The information is received by the antenna of the reader/writer, recognized by a data processing device, and processed by software.

The RF-ID tag is formed into label form or card form and the RF-ID tag can be placed to the thermoreversible recording medium. The RF-ID tag can be placed on the surface of the recording layer or the back layer and it is preferably placed on the surface of the back layer. A known adhesive or sticking agent may be used for bonding together the RF-ID tag and the thermoreversible recording medium. Moreover, the thermoreversible recording medium and the RF-ID tag may be integrated together by lamination, etc. to be formed into card form or tag form.

An example of how the thermoreversible recording medium is combined with the RF-ID tag in the process management will be described. A process line on which containers containing delivered raw materials are conveyed is equipped with a unit by which a visible image is written on the display portion of a container being conveyed, without involving contact, and a unit by which a visible image is erased without involving contact. In addition, the process line is equipped with a reader/writer for performing non-contact reading and overwriting of information by reading the information in the attached RF-ID of the container by transmission of electromagnetic waves. Furthermore, the process line is also equipped with a control unit for performing sorting, weighing and management of containers on the distribution line on the basis of the individual information of the containers being conveyed, which the information is written or read out on or from the container without involving contact with the reader/writer.

Product inspection is performed by recording such information as product name and quantity in the RF-ID tag-equipped thermoreversible recording medium attached to the container. In the next step, instruction is given to process the delivered raw material, information for processing is recorded on the thermoreversible recording medium and the RF-ID tag, thereby creating a processing instruction and the materials proceed to the processing step according to the instruction. Next, order information is recorded on the thermoreversible recording medium and RF-ID tag as an order instruction for the processed product, shipping information is read from collected containers after product shipment and containers and the thermoreversible recording medium with the RF-ID tag are used again for delivery. At this time, erasing/printing of information can be performed without peeling the thermoreversible recording medium off from the containers, etc. because this is laser-based non-contact recording on thermoreversible recording media. Furthermore, process can be managed in real time and information stored in the RF-ID tag can be displayed on the thermoreversible recording medium simultaneously, because the RF-ID can also store information without involving contact.

<Delivery Support System>

Figure 12:
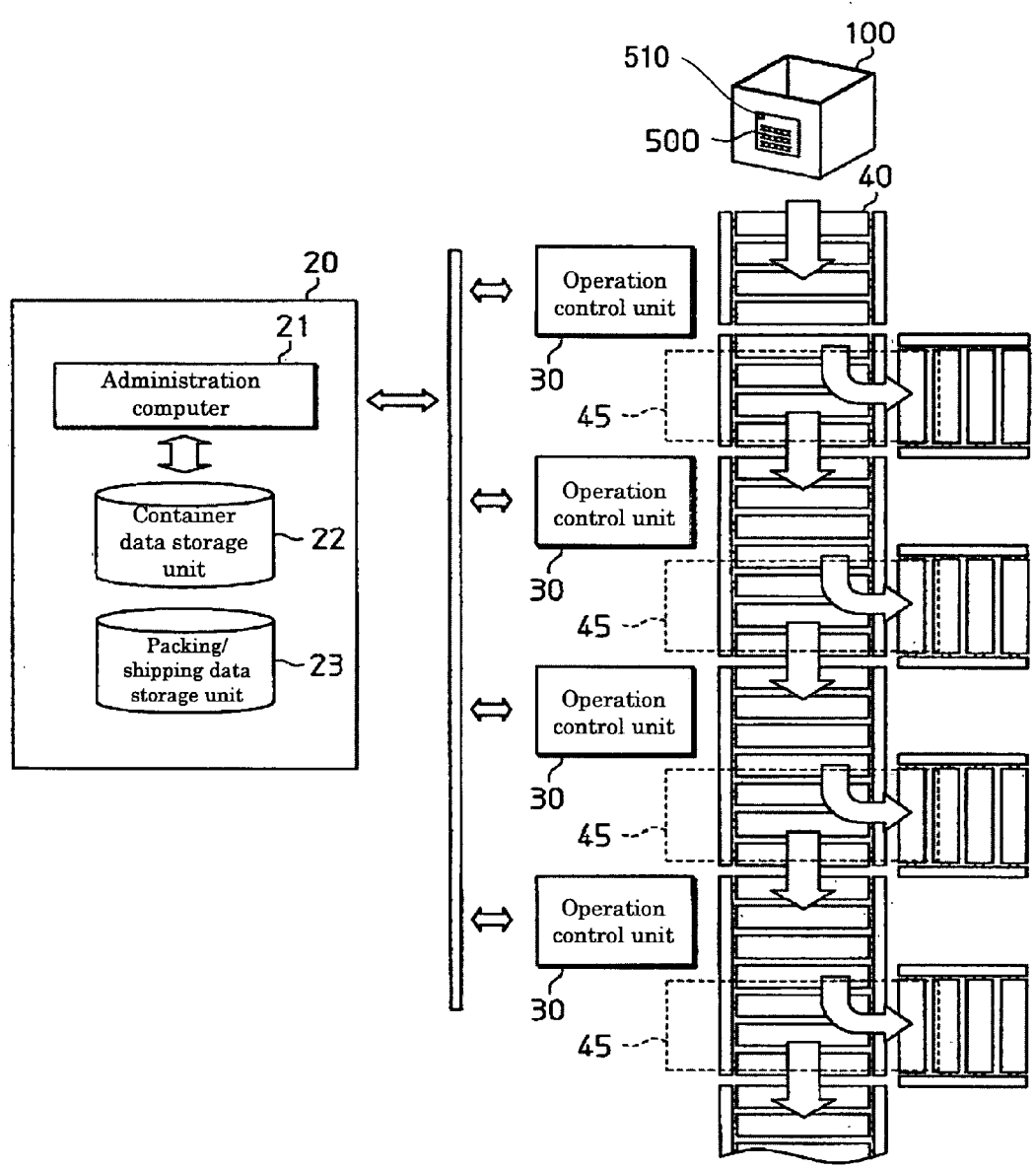
FIG. 12 is a schematic diagram showing an example of a delivery support system.

As shown in FIG. 12, the delivery support system includes an administration server 20, a container delivery line, and an operation control unit 30. The delivery support system performs packing management by attaching a thermoreversible recording medium 500 with an IC tag 510 to a container 100. In this system, the container 100 for packing is transferred by a conveyor 40. Goods to be shipped are packed in the container 100 at loading areas 45.

Figure 13:
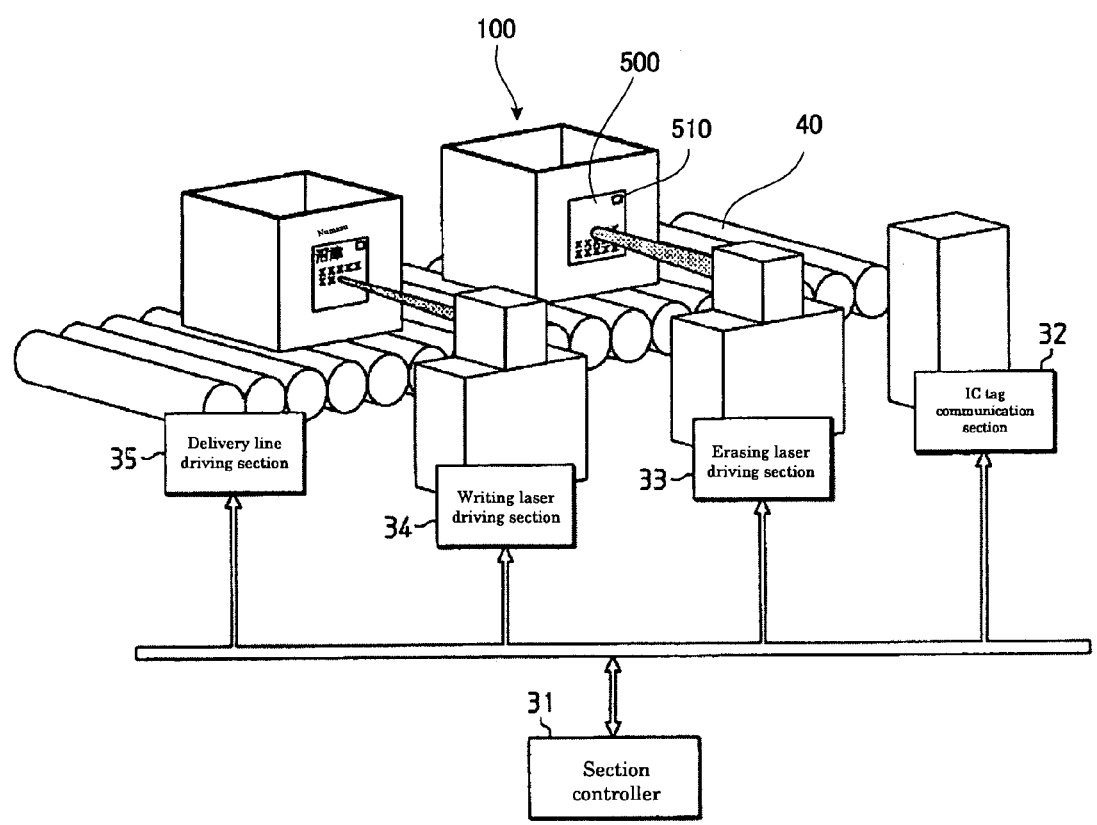
FIG. 13 is a schematic diagram showing an example of a set of process management units in the delivery support system.

The operation control units 30 will be described with reference to FIG. 13. The operation control units 30 are connected to the administration server 20 through a network, and each of the operation control units 30 includes a unit controller 31 serving as a controlling means, an IC tag communication section 32, an erasing laser driving section 33, a writing laser driving section 34, and a delivery line driving section 35.

The unit controller 31 controls the above-mentioned sections 32 to 35, and executes various processes regarding the thermoreversible recording medium. The unit controller 31 includes a central processing unit (CPU), a random access memory (RAM) and a read only memory (ROM) (all not shown in the drawing) for processing steps such as an goods identification step, a writing step and an erasing step, and the unit controller 31 functions as various units such as a goods identification unit, a writing unit and an updating unit, by executing control programs designed for conducting those steps.

The IC tag communication section 32 provides electricity to the IC tag 510 without involving contact, and sends and receives data to and from the IC tag 510. Data are thereby stored in or read from the IC tag 510.

Although not shown, the writing laser driving section 34 includes an imaging device, a writing laser source and an optical mechanism.

The delivery line driving section 35 may adjust the conveyance speed by reducing the speed thereof or stopping the conveyor in accordance with erasing/writing state. Furthermore, the delivery line driving section 35 provides the unit controller 31 with data on conveyance speed.

Delivery goods packing procedures involving the administration server 20, the operation control units 30, and the thermoreversible recording medium 500, configured as mentioned above, will be described with reference to FIG. 14

A packing instruction is made before the packing procedures begin. Specifically, the administration computer 21 searches a delivery management data storage unit (not shown) for goods scheduled to be shipped. The administration computer 21 then allocates a package ID to a container that contains goods identified to be packed/shipped. And the administration computer 21 records in a packing-shipping data storage unit 23 packing/shipping data including goods IDs and the number of goods under the package ID.

Then, the container 100 used for packing is placed on the conveyor 40 for transfer.

When the container 100 reaches one of the operation control units 30, the administration computer 21 first starts identifying the container 100 (step S1-1). Specifically, the unit controller 31 of the operation control unit scans the tag ID of the IC tag 510 contained in the thermoreversible recording medium 500 using the IC tag communication section 32. The unit controller 31 transmits scanned tag ID data to the administration server via the network.

The administration computer 21 of the administration server that has received the tag ID data identifies the package to be shipped in the container (step S1-2).

Subsequently, the administration computer 21 allocates a package suitable for the size of the container 100 in accordance with the packing/shipping data stored in the packing-shipping data storage unit 23.

Specifically, the administration computer 21 acquires information on the volume of good based on each good ID included in the packing/shipping data from a goods data storage unit (not shown). Then, the administration computer estimates the total volume of all goods having one package ID by multiplying the volumes by the numbers of the goods. And based on the estimated total volume, the administration computer allocates a package ID to a container 100 that is smaller than the estimated total volume.

When it is the first time for the package ID to be allocated to a container, the administration computer 21 records "1" into the usage record contained in container data of the container 100. Then, the administration computer 21 sends to the unit controller 31 an instruction to write to the IC tag 510. The allocated package ID and all package goods data (including the goods IDs and the number of goods) contained in package-shipping data under the package ID will be sent together with the instruction.

During the writing step, the unit controller 31 first initializes a RAM region of the IC tag 510 using the IC tag communication section 32. Then, the unit controller 31 writes the package ID and all package goods data (including the goods IDs and the number of goods), transmitted from the administration computer, to the RAM region of the IC tag 510.

Next, the unit controller 31 specifies the first goods to be packed, among the goods of the specified package (step S1-3). Here, the unit controller 31 identifies any goods ID from the first goods to be packed based on the goods IDs which are recorded in the RAM region of the IC tag 510. And then, the unit controller 31 temporarily stores data on goods having the goods IDs identified and delete data relating to the goods IDs from the RAM region of the IC tag 510.

Next, the unit controller 31 executes an erasing step (step S1-4).

Then the unit controller 31 determines the laser irradiation area and laser light intensity based on the conveyance speed of the delivery line driving section 35 and an image taken with the imaging device. When the container 100 is tilted against a laser beam, the laser irradiation area becomes narrow. Moreover, the laser light intensity applied to the surface of the thermoreversible recording medium 500 is reduced. Thus, based on the conveyance speed, the laser scanning range and laser light intensity suitable for rising surface temperature in the range of 120° C. to 160° C. is determined. At this time, in this step, the laser beam is defocused and thereby the laser irradiation area will be large as compared to the writing step. A lower surface temperature suitable for erasing can be thereby achieved. Furthermore, shorter erasing time can be achieved because of the large laser irradiation area.

The unit controller 31 then sends to the erasing laser driving section 33, in which the optical mechanism is contained, an instruction to apply an erasing laser beam.

The unit controller 31 then executes a writing step (step S1-5).

In this step, the unit controller 31 determines the laser irradiation area and laser light intensity based on the conveyance speed of the delivery line driving section 35 and the image taken with the imaging device. The laser scanning range is determined based on the conveyance speed, and furtherer, the laser light intensity that raises the surface temperature 180° C. is calculated. Thus, a proper laser irradiation area can be obtained even when the container 100 is tilted.

Then the unit controller 31 creates a packing indication (step S3-4). Specifically, the unit controller 31 creates imaging data for writing the thermoreversible recording medium 500 data, based on all package goods data including the goods IDs and the number of goods received from the administration computer 21. That imaging data is adjusted in accordance with tilt offset, and the pattern of a writing laser is determined based on the conveyance speed of the delivery line driving section 35.

The unit controller 31 sends to the writing laser driving section 34, in which the optical mechanism is contained, an instruction to apply a writing laser beam. The goods to be packed at the loading areas 45 and the number of these goods are thereby displayed on the thermoreversible recording medium 500.

Then the goods indicated on the thermoreversible recording medium 500 are packed at the loading areas 45.

The steps S1-1 to S1-5 are repeated at each of the operation control units 30. The unit controller 31 identifies the container (step S1-1) and allocates a package to be packed in the container (step S1-2). When package ID data have already been stored in the RAM region of the IC tag 510, the unit controller specifies goods to be packed out of unflagged goods IDs (step S1-3). In this case, a package packed in the container 100 has already specified, thus the unit controller 31 acquires goods IDs and the number of goods to be newly packed, from the RAM region using the IC tag communication section 32, temporarily store data thus obtained therein, and deletes that data from the RAM region of the IC tag 510.

The administration computer 21 further executes the steps of erasing the indication formed on the thermoreversible recording medium 500 (step S1-4) and writing indication on goods IDs and the number of goods to be packed (step S1-5). In this way goods are sequentially packed in the container 100.

According to the present invention, it is possible to solve the foregoing conventional problems and to provide an image processing method and an image processing apparatus, wherein even with a defocused laser beam like parallel light, it is possible to uniformly impart light energy over a thermoreversible recording medium by making the laser energy level per unit area on the medium almost constant even when the laser output angle is changed, i.e., by using parallel light as a laser beam and by making the laser scanning speed for the peripheral region surrounding the central region of the optical axis of the laser beam lower than the laser scanning speed for the central region, making the laser output for the peripheral region greater than the output for the central region, or making an overlapping area between a laser irradiation area that corresponds to a peripheral region surrounding a central region of the optical axis of the laser beam and a nearby laser irradiation area larger than an overlapping area between a laser irradiation area that corresponds to the central region and the nearby laser irradiation area, whereby it is made possible to achieve extensive printing by expanding an area to be printed, to ensure sufficient time available for image erasing, and to achieve complete image-erasing.

EXAMPLES

The present invention will be described with reference to Examples, which however shall not be construed as limiting the scope of the present invention.

Preparation Example 1

<Preparation of Thermoreversible Recording Medium>

A thermoreversible recording medium that offers temperature-dependent reversible changes in color tone (between clear state and color-developed state) was prepared as follow.

Support

A milky polyester film (Tetron Film U2L98W by Teijin Dupont Films Japan Ltd.) of 125 µm thickness was used as a support.

Under Layer

A coating solution for under layer was prepared by mixing together 30 parts by mass of styrene-butadiene copolymer (PA-9159 by Nippon A&L Inc.), 12 parts by mass of polyvinyl alcohol resin (Poval PVA103 by Kuraray Co., Ltd.), 20 parts by mass of hollow particles (Microsphere R-300 by Matsumoto Yushi-Seiyaku Co., Ltd.) and 40 parts by mass of water, followed by 1 hour stirring until homogenous.

Next, the support was coated with the obtained coating solution for under layer by means of a wire bar, heated at 80° C. for 2 minutes and dried to form an under layer of 20 µm thickness.

Reversible Thermosensitive Recording Layer (Recording Layer)

Five parts by mass of the reversible developer represented by the following Structural Formula (1), 0.5 parts by mass each of two different decolorization accelerators respectively represented by the following Structural Formulas (2) and (3), 10 parts by mass of 50% by mass solution of acrylpolyol (hydroxyl value: 200) and 80 parts by mass of methyl ethyl ketone were mixed and dispersed using a ball mill until the average particle diameter was approximately equal to 1 µm.

(Reversible Developer)

Structural Formula 1

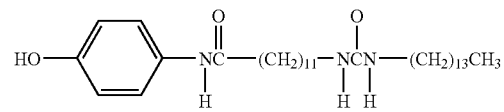

(Decolorization Accelerator)

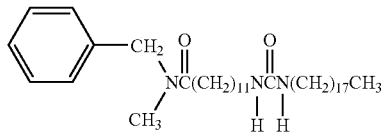

Structural Formula 2

C₁₇H₃₅CONHC₁₈H₃₅    Structural Formula 3

Next, 1 part by mass of 2-anilino-3-methyl-6dibutylaminofluoran as a leuco dye, 0.2 parts by mass of phenol antioxidant (IRGANOX565 by Ciba Specialty Chemicals K.K.) represented by the following Structural Formula (4), and 5 parts by mass of isocyanate (Colonate HL by Nippon Plyurethane Industry Co., Ltd.) were added to the dispersion solution in which the reversible developer had been dispersed, and stirred thoroughly to prepare a coating solution for recording layer.

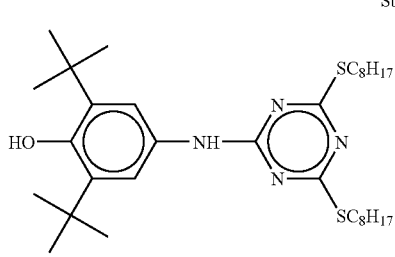

Structural Formula 4

Next, the support on which the under layer had already been formed was coated with the obtained coating solution for recording layer by means of a wire bar, and the coating solution was dried at 100° C. for 2 minutes followed by curing at 60° C. for 24 hours to form a recording layer of approximately 11 μm thickness.

Intermediate Layer

Three parts by mass of 50% by mass solution of acrylpolyol resin (LR327 by Mitsubishi Rayon Co., Ltd.), 7 parts by mass of 30% by mass dispersion solution of zinc oxide particle (ZS303 by Sumitomo Osaka Cement Co., Ltd.), 1.5 parts by mass of isocyanate (Colonate HL by Nippon Polyurethane Industry Co., Ltd.) and 7 parts by mass of methyl ethyl ketone were mixed together and stirred thoroughly to prepare a coating solution for intermediate layer.

Next, the support, on which the under layer and the recording layer had already been formed, was coated with the coating solution for intermediate layer by means of a wire bar, heated at 90° C. for 1 minute, dried and again heated at 60° C. for 2 hours to form an intermediate layer of approximately 2 μm thickness.

Protective Layer

Three parts by mass of pentaerythritolhexaacrylate (KAYARAD DPHA by Nippon Kayaku Co., Ltd.), 3 parts by mass of urethanacrylateoligomer (Art Resin UN-3320HA by Negami Chemical Industrial Co., Ltd.), 3 parts by mass of acrylic acid ester of pentaerythritolcaprolactone (KAYARAD DPCA-120 by Nippon Kayaku Co., Ltd.), 1 part by mass of silica (P526 by Mizusawa Industrial Chemical, Ltd.), 0.5 parts by mass of photopolymerization initiator (Irgacure® 184 by Nihon Ciba-Geigy K.K.) and 11 parts by mass of isopropyl alcohol were mixed together and stirred thoroughly by means of ball mill until the average particle diameter became approximately 3 μm. In this way a coating solution for protective layer was prepared.

Next, the support, on which the under layer, the recording layer and the intermediate layer had already been formed, was coated with the coating solution for protective layer by means of a wire bar, heated at 90° C. for 1 minute, dried and cross-liked by means of an ultraviolet lamp of 80 W/cm to form a protective layer of approximately 4 μm thickness.

Back Layer 7.5 parts by mass of pentaerythritolhexaacrylate (KAYARAD DPHA by Nippon Kayaku Co., Ltd.), 2.5 parts by mass of urethaneacrylateoligomer (Art Resin UN-3320HA by Negami Chemical Industrial Co., Ltd.), 2.5 parts by mass of needle-shaped conductive titanium oxide (FT-3000 by Ishihara Sangyo Kaisha, Ltd., long axis=5.15 μm, short axis=0.27 μm, composition: titanium oxide coated with antimony-doped tin oxide), 0.5 parts by mass of photopolymerization initiator (Irgacure 184 by Nippon Ciba-Geigy K.K.) and 13 parts by mass of isopropyl alcohol were mixed together and stirred thoroughly by means of ball mill to prepare a coating solution for back layer.

Next, a surface of the support, the other side of which the recording layer, the intermediate layer and the protective layer had already been formed, was coated with the coating solution for back layer by means of a wire bar, heated at 90° C. for 1 minute, dried and cross-linked by means of an ultraviolet lamp of 80 W/cm to form a back layer of approximately 4 μm thickness. In this way a thermoreversible recording medium of Preparation Example 1 was prepared.

Preparation Example 2

<Preparation of Thermoreversible Recording Medium>

A thermoreversible recording medium that offers temperature-dependent reversible changes in transparency (between clear state and clouded state) was prepared as follow.

Support

A transparent PET film (Lumilar 175-T12 by Toray Industries, Inc.) of 175 μm thickness was used as a support.

Reversible Thermosensitive Recording Layer (Recording Layer)

In a glass bottle, 3 parts by mass of low-molecular-weight organic substance represented by the following Structural Formula (5) and 7 parts by mass of docosyl benenate were added in a resin solution containing 26 parts by mass of vinyl chloride copolymer (ML110 by Zeon Corp.) dissolved in 210 parts by mass of methyl ethyl ketone. Ceramic beads of 2 mm diameter were placed in the glass bottle, followed by dispersing treatment for 48 hours by using a paint shaker (by Asada Iron Works, Co., Ltd.). In this way a uniform dispersion solution was obtained.

Structural Formula 5

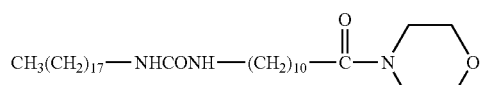

Next, 4 parts by mass of isocyanate compound (Colonate 2298-90T by Nippon Polyurethane Industry Co., Ltd.) were added to the obtained dispersion solution to prepare a solution for thermosensitive recording layer.

The support (an adhesion layer of PET film having a magnetic recording layer) was then coated with the obtained solution for thermosensitive recording layer, heated and dried. Thereafter, the support was allowed to stand for 24 hours at 65° C. for cross-linking of resin, whereby a thermosensitive recording layer of approximately 10 μm thickness was formed.

Protective Layer

The thermosensitive recording layer was coated with a solution which consists of 10 parts by mass of 75% butyl acetate solution of urethane acrylate ultraviolet-curable resin (Unidic C7-157 by Dainippon Ink and Chemicals, Inc.) and 10 parts by mass of isopropyl alcohol by means of a wire bar, heated, dried and then hardened by irradiating an ultraviolet light by means of a high pressure mercury lamp of 80 W/cm to form a protective layer of approximately 3 μm thickness. In this way a thermoreversible recording medium of Preparation Example 2 was prepared.

Preparation Example 3

<Preparation of Thermoreversible Recording Medium>

A thermoreversible recording medium of Preparation Example 3 was prepared as in Preparation Example 1 except that 0.03 parts by mass of photothermal conversion material (Excolor® IR-14 by Nippon Shokubai Co., Ltd.) was added in the recording layer upon fabrication of the thermoreversible recording medium.

Example 1

Using a laser marker equipped with a $CO_2$ laser of 40 W output power (LP-440 by Sunx Ltd.), an image was formed on a 500 mm×620 mm area of the thermoreversible recording medium of Preparation Example 1 under the following laser condition: output power=6 W, irradiation distance (focal distance)=185 mm, spot diameter=about 0.2 mm, and scan speed=2,000 mm/s.

Subsequently, the fθ lens was removed from the laser marker, and the beam expander was adjusted so that the laser spot diameter was about 3 mm over an irradiation distance range of 185 mm to 1,000 mm.

Figure 11:
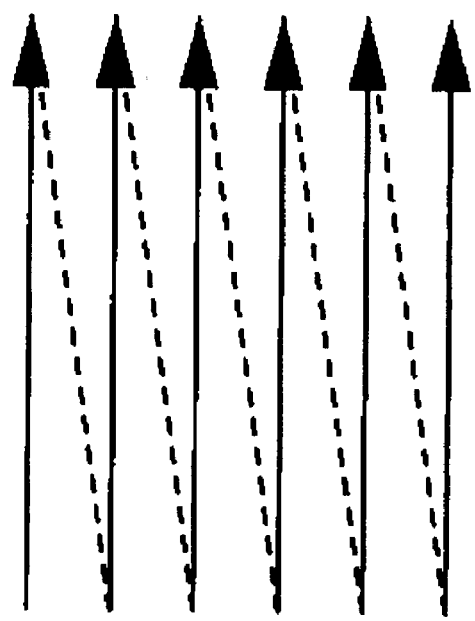
FIG. 11 shows a laser scanning mode of the present invention.

In the laser marker, the direction in which a laser beam is emitted is fixed to the normal of a recording medium, the laser output was set to 16 W, and the irradiation distance was set to 950 mm. The medium was then fixed to the X stage of an X-Y stage, and a laser beam was swept over a 50 mm×620 mm area of the medium in the Y direction using a mirror while moving the medium in X direction at a scanning speed of 1,200 mm/s in such a way that the overlapping area between adjacent laser irradiation areas was 2.4 mm in width as shown in FIG. 11, with the scanning speed changed from 1,200 mm/s to 1,100 mm/s in incremental steps with increasing distance from the central region of the optical axis of the laser beam. As a result, it succeeded in erasing the image completely all over the area.

Example 2

Using a laser marker equipped with a $CO_2$ laser of 40 W output power (LP-440 by Sunx Ltd.), an image was formed on a 500 mm×620 mm area of the thermoreversible recording medium of Preparation Example 1 under the following laser condition: output power=6 W, irradiation distance (focal distance)=185 mm, spot diameter=about 0.2 mm, and scan speed=2,000 mm/s.

Subsequently, the fθ lens was removed from the laser marker, and the beam expander was adjusted so that the laser spot diameter was about 3 mm over an irradiation distance range of 185 mm to 1,000 mm.

In this laser marker, the laser output was set to 32 W, the irradiation distance was set to 950 mm, and the laser-irradiatable area was set to 620 mm×620 mm. The above-noted image was formed so that its center comes to the central region of the optical axis of the laser beam to be applied. As shown in FIG. 11, using this laser marker, laser beams were linearly swept over the 50 mm×620 mm area of the medium in the same direction in such a way that, when the image recording area is divided into 10 sections with the central region of the optical axis of laser beam at the center, the overlapping area between adjacent laser irradiation areas was 2.4 mm in width, while changing the laser scanning speed from 2,400 mm/s to 2,200 mm/s in incremental steps from the center toward the periphery of the area. As a result, it succeeded in completely erasing the image all over the area.

Example 3

Using the laser marker of Example 2, an image was formed on the thermoreversible recording medium of Preparation Example 1 as in Example 1. Subsequently, as in Example 2, the fθ lens was removed from the laser marker, and the beam expander was adjusted so that the laser spot diameter was about 3 mm over an irradiation distance range of 185 mm to 1,000 mm.

In this laser marker, the irradiation distance was set to 950 mm, the laser-irradiatable area was set to 620 mm×620 mm, and the laser scanning speed was set to 2,400 mm/s. The above-noted image was formed so that its center comes to the central region of the optical axis of the laser beam to be applied. As shown in FIG. 11, using the laser marker laser beams were linearly swept over the 50 mm×620 mm area of the medium in the same direction in such a way that, when the image recording area is divided into 10 sections with the central region of the optical axis of laser beam at the center, the overlapping area between adjacent laser irradiation areas was 2.4 mm in width, while changing the laser output from 32 W to 35.2 W in incremental steps from the center toward the periphery of the area. As a result, it succeeded in completely erasing the image all over the area.

Example 4

Using the laser marker of Example 2, an image was formed on the thermoreversible recording medium of Preparation Example 1 as in Example 1. Subsequently, as in Example 2, the fθ lens was removed from the laser marker, and the beam expander was adjusted so that the laser spot diameter was about 3 mm over an irradiation distance range of 185 mm to 1,000 mm.

In this laser marker, the laser output was set to 32 W, the irradiation distance was set to 950 mm, the laser-irradiatable area was set to 620 mm×620 mm, and the laser scanning speed was set to 2,400 mm/s. The above-noted image was formed so that its center comes to the central region of the optical axis of the laser beam to be applied. As shown in FIG. 11, using this laser marker, laser beams were linearly swept over the 50 mm×620 mm area of the medium in the same direction in such a way that, when the image recording area is divided into 10 sections with the central region of the optical axis of laser beam at the center, the overlapping area between adjacent laser irradiation areas changes from 2.4 mm to 2.5 mm in width in incremental steps from the center toward the periphery of the area. As a result, it succeeded in completely erasing the image all over the area.

Example 5

A fθ lens was removed from LP-440, a laser marker by Sunx Ltd., which is equipped with a $CO_2$ laser source with an output power of 40 W, and its beam expander was adjusted so that the laser spot diameter was about 3 mm over an irradiation distance range of 185 mm to 1,000 mm.

In this laser marker, the laser output was set to 32 W, the irradiation distance was set to 950 mm, and the laser-irradiatable area was set to 620 mm×620 mm. As shown in FIG. 11, using this laser marker, laser beams were linearly swept over a 50 mm×620 mm area of the thermoreversible recording medium of Preparation Example 2 in the same direction in such a way that, when the image recording area is divided into 10 sections with the central region of the optical axis of laser beam at the center, the overlapping area between adjacent laser irradiation areas was 2.7 mm in width, while changing the laser scanning speed from 2,400 mm/s to 2,200 mm/s in incremental steps from the center toward the periphery of the area. As a result, it succeeded in obtaining a solid image with a uniform density all over the area.

Example 6

A fθ lens was removed from LP-440, a laser marker by Sunx Ltd., which is equipped with a $CO_2$ laser source with an output power of 40 W, and its beam expander was adjusted so that the laser spot diameter was about 3 mm over an irradiation distance range of 185 mm to 1,000 mm.

In the laser marker, the direction in which a laser beam is emitted is fixed to the normal of a recording medium, the laser output was set to 16 W, and the irradiation distance was set to 950 mm. The medium of Preparation Example 1 was then fixed to the X stage of an X-Y stage, and a laser beam was swept over a 50 mm×620 mm area of the medium in the Y direction using a mirror while moving the medium in X direction at a scanning speed of 12.00 mm/s in such a way that the overlapping area between adjacent laser irradiation areas was 2.7 mm in width as shown in FIG. 11, with the scanning speed changed from 1,200 mm/s to 1,100 mm/s in incremental steps with increasing distance from the central region of the optical axis of the laser beam. As a result, it succeeded in obtaining a solid image with a uniform density all over the area.

Example 7

In the laser marker of Example 5, the irradiation distance was set to 950 mm, the laser-irradiatable area was set to 620 mm×620 mm, and the laser scanning speed was set to 2,400 mm/s. As shown in FIG. 11, using the laser marker, laser beams were linearly swept over a 50 mm×620 mm area of the thermoreversible recording medium of Preparation Example 1 in the same direction in such a way that, when the image recording area is divided into 10 sections with the central region of the optical axis of laser beam at the center, the overlapping area between adjacent laser irradiation areas was 2.7 mm in width, while changing the laser output from 32 W to 35.2 W in incremental steps from the center toward the periphery of the area. As a result, it succeeded in obtaining a solid image with a uniform density all over the area.

Example 8

In the laser marker of Example 5, the laser output was set to 32 W, the irradiation distance was set to 950 mm, the laser-irradiatable area was set to 620 mm×620 mm, and the laser scanning speed was set to 2,400 mm/s. As shown in FIG. 11, using this laser marker, laser beams were linearly swept over a 50 mm×620 mm area of the thermoreversible recording medium of Preparation Example 1 in the same direction in such a way that, when the image recording area is divided into 10 sections with the central region of the optical axis of laser beam at the center, the overlapping area between adjacent laser irradiation areas changes from 2.7 mm to 2.8 mm in width in incremental steps from the center toward the periphery of the area. As a result, it succeeded in obtaining a solid image with a uniform density all over the area.

Example 9

In the laser marker of Example 5, the irradiation distance was set to 950 mm, the laser-irradiatable area was set to 620 mm×620 mm, and the laser scanning speed was set to 2,400 mm/s. As shown in FIG. 11, using this laser marker, laser beams were linearly swept over a 50 mm×620 mm area of the thermoreversible recording medium of Preparation Example 2 in the same direction in such a way that, when the image recording area is divided into 10 sections with the central region of the optical axis of laser beam at the center, the overlapping area between adjacent laser irradiation areas was 2.7 mm in width, while changing the laser output from 32 W to 35.2 W in incremental steps from the center toward the periphery of the area. As a result, it succeeded in obtaining a solid image with a uniform density all over the area.

Subsequently, in this laser marker, the laser output was set to 32 W, the irradiation distance was set to 950 mm, the laser-irradiatable area was set to 620 mm×620 mm, and the laser scanning speed was set to 2,400 mm/s. The above-noted image was formed so that its center comes to the central region of the optical axis of the laser beam to be applied. As shown in FIG. 11, using this laser marker, laser beams were linearly swept over the 50 mm×620 mm area of the medium in the same direction in such a way that, when the image recording area is divided into 10 sections with the central region of the optical axis of laser beam at the center, the overlapping area between adjacent laser irradiation areas changes from 2.4 mm to 2.5 mm in width in incremental steps from the center toward the periphery of the area. As a result, it succeeded in completely erasing the image all over the area.

Example 10

Using a laser marker equipped with a $CO_2$ laser of 40 W output power (LP-440 by Sunx Ltd.), an image was formed on a 500 mm×620 mm area of the thermoreversible recording medium of Preparation Example 2 under the following laser condition: output power=5 W, irradiation distance (focal distance)=185 mm, spot diameter=about 0.2 mm, and scan speed=2,000 mm/s.

Subsequently, the fθ lens was removed from the laser marker, and the beam expander was adjusted so that the laser spot diameter was about 3 mm over an irradiation distance range of 185 mm to 1,000 mm.

In this laser marker, the laser output was set to 25 W, the irradiation distance was set to 950 mm, and the laser-irradiatable area was set to 620 mm×620 mm. The above-noted image was formed so that its center comes to the central region of the optical axis of the laser beam to be applied. As shown in FIG. 11, using this laser marker, laser beams were linearly swept over the 50 mm×620 mm area of the medium in the same direction in such a way that, when the image recording area is divided into 10 sections with the central region of the optical axis of laser beam at the center, the overlapping area between adjacent laser irradiation areas was 2.4 mm in width, while changing the laser scanning speed from 2,400 mm/s to 2,200 mm/s in incremental steps from the center toward the periphery of the area. As a result, it succeeded in completely erasing the image all over the area.

Example 11

In the laser marker of Example 5, a mask was placed that cuts through the center of a laser beam in the optical path of the laser beam. The laser source was adjusted so that, in the light intensity distribution of the laser beam in its cross-section cut along a direction substantially orthogonal to the beam travel direction, the light intensity of the central region is 0.5 times that of the peripheral regions. Subsequently, in this laser marker, the laser output was set to 32 W, the irradiation distance was set to 950 mm, and the laser-irradiatable area was set to 620 mm×620 mm. As shown in FIG. 11, using this laser marker, laser beams were linearly swept over a 50 mm×620 mm area of the thermoreversible recording medium of Preparation Example 1 in the same direction in such a way that, when the image recording area is divided into 10 sections with the central region of the optical axis of laser beam at the center, the overlapping area between adjacent laser irradiation areas was 2.8 mm in width, while changing the laser scanning speed from 1,000 mm/s to 920 mm/s in incremental steps from the center toward the periphery of the area. As a result, it succeeded in obtaining a solid image with a uniform density all over the area.

Next, the irradiation distance was set to 950 mm, and the laser scanning speed was set to 1,000 mm/s. The above-noted image was formed so that its center comes to the central region of the optical axis of the laser beam to be applied. As shown in FIG. 11, laser beams were linearly swept over the 50 mm×620 mm area of the medium in the same direction in such a way that, when the image recording area is divided into 10 sections with the central region of the optical axis of laser beam at the center, the overlapping area between adjacent laser irradiation areas was 2.4 mm in width, while changing the laser output from 12 W to 13.2 W in incremental steps from the center toward the periphery of the area. As a result, it succeeded in completely erasing the image all over the area.

A cycle of image formation/erasing was repeated 300 times under the above-noted condition; it succeeded in achieving complete image recording and image erasing.

Example 12

As a semiconductor laser marker, a fiber-coupled, high-output semiconductor laser device (NBT-S140mkII by Jenoptik Laserdiode, central wavelength: 808 nm, optical fiber core diameter: 600 μm, NA: 0.22) with a laser output of 140 W was prepared. The laser output was set to 12 W, radiation distance to 91.4 mm and spot to about 0.6 mm. At a XY stage feed rate of 1,200 mm/s, an image was recorded on a 50 mm×620 mm area of the thermoreversible recording medium of Preparation Example 3 using this laser marker.

The beam expander was then adjusted so that the laser spot diameter was about 3 mm over an irradiation distance range of 90 mm to 1,000 mm, and in the laser marker, the direction in which a laser beam is emitted is fixed to the normal of a recording medium, the laser output was set to 16 W, and the irradiation distance was set to 950 mm. The medium was then fixed to the X stage of an X-Y stage, and a laser beam was swept over a 50 mm×620 mm area of the medium in the Y direction using a mirror while moving the medium in X direction at a scanning speed of 1,200 mm/s in such a way that the overlapping area between adjacent laser irradiation areas was 2.4 mm in width as shown in FIG. 11, with the scanning speed changed from 1,200 mm/s to 1,100 mm/s in incremental steps with increasing distance from the central region of the optical axis of the laser beam. As a result, it succeeded in completely erasing the image all over the area.

Example 13

<Example of Use as Label>
On the support used in the <Preparation of Thermoreversible Recording Medium> section of Preparation Example 1, the under layer of Preparation Example 1 and the recording layer were sequentially disposed.

Subsequently, a coating solution for layer that contains polymer with a UV-absorbing structure, prepared in the following manner, was applied over the under layer and recording layer-coated support by means of a wire bar, dried at 90° C. for 1 minute, and heated at 50° C. for 24 hours to form a 2 mm thick layer containing polymer with a UV-absorbing structure, or an intermediate layer.

Preparation of Coating Solution for Layer Containing Polymer with UV-Absorbing Structure (Intermediate Layer)

A composition consisting of 20 parts by mass of 40% by mass solution of UV-absorbable polymer (PUVA-60MK-40K by Otsuka Chemical Co., Ltd., hydroxyl value: 60), 3.2 parts by mass of xylenediisocyanate (D-110N by Mitsui Chemicals Polyurethanes, Inc.) and 23 parts by mass of methyl ethyl ketone (MEK) was thoroughly stirred with a ball mill to prepare a coating solution for layer containing polymer with a UV-absorbing structure.

Next, the coating solution protective layer, used in <Preparation of Thermoreversible Recording Medium> section, was applied over the intermediate layer of Preparation Example 1 to form a protective layer of 4 μm thickness.

A coating solution for sticking layer, prepared in the manner described below, was applied over a surface of the support by means of a wire bar, the surface where the foregoing under layer, recording layer, intermediate layer and protective layer not being provided, followed by drying at 90° C. for 2 minutes to form a sticking layer of approximately 20 μm thickness. In this way a thermoreversible recording label was fabricated.

Preparation of Coating Solution for Sticking Layer

A composition consisting of 50 parts by mass of acrylic sticking agent (BPS-1109 by Toyo Ink MFG. Co., Ltd.) and 2 parts by mass of isocyanate (D-170N by Mitsui Chemicals Polyurethanes Inc.) was stirred thoroughly to prepare a coating solution for sticking layer.

The thermoreversible recording label prepared above was cut into a 50 mm×70 mm piece, bonding it to a plastic box. The plastic box was placed on a conveyor and transferred at a speed of 12 m/min, and in this state, a solid image was recorded on and erased from the label in a manner similar to those described in Examples 2-12. While it needs 2.7 seconds to record or erase the solid image on or from the thermoreversible recording label with a dimension of 50 mm×70 mm, it succeeded in obtaining 3.45 seconds in which the label passes by the laser-irradiatable area. Accordingly, it succeeded in achieving complete image recording and image erasing.

Example 14

<Example of Use as Tag or Sign>

On the support used in used in <Preparation of Thermoreversible Recording Medium> section of Preparation Example 1, the recording layer, intermediate layer and protective layer, prepared in Preparation Example 1, were sequentially applied to produce a top surface sheet. Moreover, on the support used in <Preparation of Thermoreversible Recording Medium> section of Preparation Example 1, only the back layer prepared in Preparation Example 1 was applied, producing a bottom surface sheet. Each sheet was cut into a 210 mm×85 mm piece, and a RF-ID inlet (by DSM Nutritional Products) and a PETG sheet (by Mitsubishi Plastics, Inc.) as a spacer surrounding the inlet were interposed between them. Thereafter, the sheets were bonded together with an adhesive tape (by Nitto Denko Corporation). In this way a RF-ID-contained thermoreversible recording tag of 500 μm thickness was fabricated.

The RF-ID-contained thermoreversible recording tag thus fabricated was attached to a box, and image recording and image erasing were performed as in Example 8. It succeeded in complete image recording and erasing.

Comparative Example 1

An image formed on a 50 mm×620 mm area of the thermoreversible recording medium of Preparation Example 1 was erased as in Example 1 using the image-erasing condition of Example 1 except that the scanning speed in Y direction was fixed to 1,200 mm/s. As a result, it succeeded in completely erasing the image on the medium in the central region of the optical axis of the laser beam, but the frequency of image-erasing failure increased with increasing distance from the central region.

Comparative Example 2

An image formed on a 50 mm×620 mm area of the thermoreversible recording medium of Preparation Example 1 was erased as in Example 2 using the image-erasing condition of Example 2 except that the laser scanning speed in Y direction was fixed to 2.400 mm/s. As a result, it succeeded in completely erasing the image on the medium in the central region of the optical axis of the laser beam, but the frequency of image-erasing failure increased with increasing distance from the central region.

Comparative Example 3

An image was formed on a 50 mm×620 mm area of the thermoreversible recording medium of Preparation Example 1 as in Example 6 using the image-recording condition of Example 6 except that the scanning speed in Y direction was fixed to 1,200 mm/s. As a result, it succeeded in obtaining uniform density in the central region of the optical axis of the laser beam, but density unevenness increased with increasing distance from the central region.

Comparative Example 4

An image was formed on a 50 mm×620 mm area of the thermoreversible recording medium of Preparation Example 2 as in Example 5 using the image-recording condition of Example 5 except that the scanning speed was fixed to 2,400 mm/s. As a result, it succeeded in obtaining uniform density in the central region of the optical axis of the laser beam, but density unevenness increased with increasing distance from the central region.

Comparative Example 5

An image formed on a 50 mm×620 mm area of the thermoreversible recording medium of Preparation Example 2 was erased as in Example 1 using the image-erasing condition of Example 10 except that the laser scanning speed was fixed to 2,400 mm/s. As a result, it succeeded in completely erasing the image on the medium in the central region of the optical axis of the laser beam, but the frequency of image-erasing failure increased with increasing distance from the central region.

Comparative Example 6

A laser marker equipped with a $CO_2$ laser of 40 W output power (LP-440 by Sunx Ltd.) was prepared. The thermoreversible recording label prepared in Example 13 was then cut into a 50 mm×70 mm piece, bonding it to a plastic box. In this laser marker, the laser output was set to 6 W, the irradiation distance (focal distance) was set to 185 mm, the spot diameter was set to about 0.2 mm, and the laser scanning speed was set to 2,000 mm/s. Using this laser marker, an image was recorded on a 70 mm×50 mm area of the cut thermoreversible recording label.

Subsequently, the plastic box was placed on a conveyor and transferred at a speed of 12 m/min, and in this state, the laser output was set to 32 W, the irradiation distance was set to 226 mm, the laser-irradiatable area was set to 130 mm×130 mm, the spot diameter was set to about 3 mm, and the laser scanning speed was set to 2,400 mm/s, and as shown in FIG. 11, laser beams were linearly swept over the area in the same direction in such a way that the overlapping area between adjacent laser irradiation areas was 2.4 mm in width. While it needs 2.7 seconds to erase the image in the 50 mm×70 mm area, it resulted in obtaining only 1.0 second in which the label passes by the laser-irradiatable area. Accordingly, although it succeeded in erasing the 50 mm×26 mm image, it resulted in failure to erase the remaining 50 mm×44 mm image Preferred Examples of the present invention have been described in detail above. The present invention, however, is not specifically restricted in scope to these Examples, and various alternations and modifications thereof can be made without departing from the spirit and scope of the present invention defined in appended claims.

The image processing method and image processing apparatus of the present invention are capable of high-speed, repetitive recording or erasing of a high-contrast image on or from a thermoreversible recording medium without involving any contact, as well as of ensuring sufficient image-erasing time by expanding image-recording and image-erasing areas and of complete image erasing. Accordingly, the image processing method and image processing apparatus of the present invention can be used for instance for tickets, frozen meal containers, industrial products, stickers for various types of reagent containers, big monitors or displays for distribution management applications and manufacturing process management, and are particularly suitable for use in distribution/delivery systems, process management systems in factories, etc.

What is claimed is:

1. An image processing method comprising at least one of:
recording an image on a thermoreversible recording medium by heating the thermoreversible recording medium by application of a laser beam thereon; and
erasing an image from a thermoreversible recording medium by heating the thermoreversible recording medium by application of a laser beam thereon,
wherein the laser beam is parallel light and the laser scanning speed for a peripheral region surrounding a central region of the optical axis of the laser beam is lower than the laser scanning speed for the central region, and
wherein the thermoreversible recording medium offers temperature-dependent reversible changes in transparency or color tone.

2. The image processing method according to claim 1, wherein the laser beam energy level for the peripheral region surrounding the central region of the optical axis of laser beam is equal to or greater than the laser beam energy level for the central region.

3. The image processing method according to claim 1, wherein the central region correspond to a laser irradiation area on the thermoreversible recording medium, which the area is formed by a laser beam applied from a laser source to the thermoreversible recording medium at right angle to a surface thereof.

4. The image processing method according to claim 1, wherein the peripheral region corresponds to any area other than the central region of the optical axis of a laser beam applied to the thermoreversible recording medium by a scan control unit of an image processing apparatus.

5. The image processing method according to claim 1, wherein the distance through which the laser beam travels to the thermoreversible recording medium is optionally determined.

6. The image processing method according to claim 1, wherein the thermoreversible recording medium comprises at least a reversible thermosensitive recording layer formed over a support, and the reversible thermosensitive recording layer contains a resin and a low-molecular-weight organic substance.

7. The image processing method according to claim 1, wherein the thermoreversible recording medium comprises at least a reversible thermosensitive recording layer formed over a support, and the reversible thermosensitive recording layer contains a leuco dye and a reversible developer.

8. The image processing method according to claim 1, wherein in the light intensity distribution of the laser beam in its cross section cut along a direction substantially orthogonal to the beam travel direction, the intensity of the central region is equal to or less than the intensity of the peripheral region.

9. The image processing method according to claim 1, wherein the image processing method is used for at least one of recording and erasing of an image on and from a container being transferred on a distribution line in a delivery support system.

10. An image processing method comprising at least one of:
recording an image on a thermoreversible recording medium by heating the thermoreversible recording medium by application of a laser beam thereon; and
erasing an image from a thermoreversible recording medium by heating the thermoreversible recording medium by application of a laser beam thereon,
wherein the laser beam is parallel light and the laser output for a peripheral region surrounding a central region of the optical axis of the laser beam is greater than the output for the central region, and
wherein the thermoreversible recording medium offers temperature-dependent reversible changes in transparency or color tone.

11. The image processing method according to claim 10, wherein the laser beam energy level for the peripheral region surrounding the central region of the optical axis of laser beam is equal to or greater than the laser beam energy level for the central region.

12. The image processing method according to claim 10, wherein the central region correspond to a laser irradiation area on the thermoreversible recording medium, which the area is formed by a laser beam applied from a laser source to the thermoreversible recording medium at right angle to a surface thereof.

13. The image processing method according to claim 10, wherein the peripheral region corresponds to any area other than the central region of the optical axis of a laser beam applied to the thermoreversible recording medium by a scan control unit of an image processing apparatus.

14. The image processing method according to claim 10, wherein the distance through which the laser beam travels to the thermoreversible recording medium is optionally determined.

15. The image processing method according to claim 10, wherein the thermoreversible recording medium comprises at least a reversible thermosensitive recording layer formed over a support, and the reversible thermosensitive recording layer contains a resin and a low-molecular-weight organic substance.

16. The image processing method according to claim 10, wherein the thermoreversible recording medium comprises at least a reversible thermosensitive recording layer formed over a support, and the reversible thermosensitive recording layer contains a leuco dye and a reversible developer.

17. The image processing method according to claim 10, wherein in the light intensity distribution of the laser beam in its cross section cut along a direction substantially orthogonal to the beam travel direction, the intensity of the central region is equal to or less than the intensity of the peripheral region.

18. The image processing method according to claim 10, wherein the image processing method is used for at least one of recording and erasing of an image on and from a container being transferred on a distribution line in a delivery support system.

19. An image processing method comprising at least one of:
recording an image on a thermoreversible recording medium by heating the thermoreversible recording medium by application of a laser beam thereon; and
erasing an image from a thermoreversible recording medium by heating the thermoreversible recording medium by application of a laser beam thereon,
wherein the laser beam is parallel light, and an overlapping area between a laser irradiation area that corresponds to a peripheral region surrounding a central region of the optical axis of the laser beam and a nearby laser irradiation area is larger than an overlapping area between a laser irradiation area that corresponds to the central region and the nearby laser irradiation area, and
wherein the thermoreversible recording medium offers temperature-dependent reversible changes in transparency or color tone.

20. The image processing method according to claim 19, wherein the laser beam energy level for the peripheral region surrounding the central region of the optical axis of laser beam is equal to or greater than the laser beam energy level for the central region.

21. The image processing method according to claim 19, wherein the central region correspond to a laser irradiation area on the thermoreversible recording medium, which the area is formed by a laser beam applied from a laser source to the thermoreversible recording medium at right angle to a surface thereof.

22. The image processing method according to claim 19, wherein the peripheral region corresponds to any area other than the central region of the optical axis of a laser beam applied to the thermoreversible recording medium by a scan control unit of an image processing apparatus.

23. The image processing method according to claim 19, wherein the distance through which the laser beam travels to the thermoreversible recording medium is optionally determined.

24. The image processing method according to claim 19, wherein the thermoreversible recording medium comprises at least a reversible thermosensitive recording layer formed over a support, and the reversible thermosensitive recording layer contains a resin and a low-molecular-weight organic substance.

25. The image processing method according to claim 19, wherein the thermoreversible recording medium comprises at least a reversible thermosensitive recording layer formed over a support, and the reversible thermosensitive recording layer contains a leuco dye and a reversible developer.

26. The image processing method according to claim 19, wherein in the light intensity distribution of the laser beam in its cross section cut along a direction substantially orthogonal to the beam travel direction, the intensity of the central region is equal to or less than the intensity of the peripheral region.

27. The image processing method according to claim 19, wherein the image processing method is used for at least one of recording and erasing of an image on and from a container being transferred on a distribution line in a delivery support system.

28. An image processing apparatus comprising:
a laser beam application unit; and
a light intensity adjusting unit configured to change the light intensity of a laser beam, the light intensity adjusting unit being placed at the laser emission side of the laser beam application unit,
wherein the image processing apparatus is used in an image processing method which comprises at least one of:
recording an image on a thermoreversible recording medium by heating the thermoreversible recording medium by application of a laser beam thereon; and
erasing an image from a thermoreversible recording medium by heating the thermoreversible recording medium by application of a laser beam thereon,
wherein the laser beam is parallel light and the laser scanning speed for the peripheral region surrounding the central region of the optical axis of the laser beam is lower than the laser scanning speed for the central region, and
wherein the thermoreversible recording medium offers temperature-dependent reversible changes in transparency or color tone.

29. The image processing apparatus according to claim 28, wherein the light intensity adjusting unit is at least one of a lens, a filter, and a mirror.

30. An image processing apparatus comprising:
a laser beam application unit; and
a light intensity adjusting unit configured to change the light intensity of a laser beam, the light intensity adjusting unit being placed at the laser emission side of the laser beam application unit,
wherein the image processing apparatus is used in an image processing method which comprises at least one of:
recording an image on a thermoreversible recording medium by heating the thermoreversible recording medium by application of a laser beam thereon; and
erasing an image from a thermoreversible recording medium by heating the thermoreversible recording medium by application of a laser beam thereon,
wherein the laser beam is parallel light and the laser output for the peripheral region surrounding the central region of the optical axis of the laser beam is greater than the output for the central region, and
wherein the thermoreversible recording medium offers temperature-dependent reversible changes in transparency or color tone.

31. An image processing apparatus comprising:
a laser beam application unit; and
a light intensity adjusting unit configured to change the light intensity of a laser beam, the light intensity adjusting unit being placed at the laser emission side of the laser beam application unit,
wherein the image processing apparatus is used in an image processing method which comprises at least one of:
recording an image on a thermoreversible recording medium by heating the thermoreversible recording medium by application of a laser beam thereon; and
erasing an image from a thermoreversible recording medium by heating the thermoreversible recording medium by application of a laser beam thereon,
wherein the laser beam is parallel light, and an overlapping area between a laser irradiation area that corresponds to a peripheral region surrounding a central region of the optical axis of the laser beam and a nearby laser irradiation area is larger than an overlapping area between a laser irradiation area that corresponds to the central region and the nearby laser irradiation area, and
wherein the thermoreversible recording medium offers temperature-dependent reversible changes in transparency or color tone.

* * * * *